US012749115B2

(12) United States Patent
Merold et al.

(10) Patent No.: US 12,749,115 B2
(45) **Date of Patent: *Sep. 29, 2026**

(54) LOW LATENCY REGULATION OF DISTRIBUTED TRANSACTION PROCESSING IN ACCORDANCE WITH CENTRALIZED DEMAND-BASED DYNAMICALLY REALLOCATED LIMITS

(71) Applicant: Chicago Mercantile Exchange Inc., Chicago, IL (US)

(72) Inventors: Michael S. Merold, Sparta, NJ (US); Venkatesh Hegde, Chicago, IL (US); Matthew Morano, Chicago, IL (US); Francis B. Bakalar, Oak Park, IL (US); Brian G. Dugdale, Wayne, NJ (US); Indira P. Sinha, Parsippany, NJ (US); Stanislav Liberman, Vernon Hills, IL (US); Michal Sheves, New York, NY (US); Mark Bucaj, White Plains, NY (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/086,980

(22) Filed: Mar. 21, 2025

(65) Prior Publication Data

US 2025/0245745 A1 Jul. 31, 2025

Related U.S. Application Data

(63) Continuation of application No. 17/733,565, filed on Apr. 29, 2022, now Pat. No. 12,288,254.

(51) Int. Cl.
*G06Q 40/04* (2012.01)

(52) U.S. Cl.
CPC ........... *G06Q 40/04* (2013.01); *G06Q 40/044* (2025.08); *G06Q 40/045* (2025.08); *G06Q 40/0421* (2025.08)

(58) Field of Classification Search
CPC .... G06Q 40/04; G06Q 40/044; G06Q 40/045; G06Q 40/0421
See application file for complete search history.

(56) References Cited

U.S. PATENT DOCUMENTS

2014/0114832 A1* 4/2014 Escott .................... G06Q 40/04 705/37
2014/0297504 A1* 10/2014 Bergenudd ............ G06Q 40/04 705/37

(Continued)

FOREIGN PATENT DOCUMENTS

WO WO-0177957 A1 * 10/2001 ............... G06N 5/04

*Primary Examiner* — Elda G Milef
(74) *Attorney, Agent, or Firm* — Lempia Summerfield Katz LLC

(57) ABSTRACT

The disclosed embodiments relate to systems/methods for low latency regulation of distributed, e.g., geographically and/or logically, transaction processing, such as trading of financial instruments, in accordance with centralized demand-based dynamically reallocated post-trade-based limits, e.g., credit/risk limits. In particular, the disclosed embodiments relate to monitoring credit demand across execution venues, as opposed to actual utilization, and, based thereon, modifying execution specific limits to reallocate of portions of a credit/risk allotment, such as a credit/risk limit, to multiple execution venues for use in approving transactions, which may implement order driven and/or quote driven markets, so as to dynamically rebalance the allocations to the execution venues based on demand/need, rather than utilization, thereby avoiding having to mitigate latencies in determining and responding to utilization. In addition, the disclosed embodiments may maximize (Continued)

the total available amount for reallocation by recognizing inter-execution venue limit offsetting positions, i.e., trades, during the rebalancing process.

29 Claims, 4 Drawing Sheets

(56) References Cited

U.S. PATENT DOCUMENTS

2019/0349309 A1* 11/2019 Bonig .................. H04L 47/283
2021/0034505 A1* 2/2021 Wackerly ............ G06F 11/3688

* cited by examiner

LOW LATENCY REGULATION OF DISTRIBUTED TRANSACTION PROCESSING IN ACCORDANCE WITH CENTRALIZED DEMAND-BASED DYNAMICALLY REALLOCATED LIMITS

PRIORITY

This application claims the benefit of U.S. patent application Ser. No. 17/733,565, now U.S. Pat. No. 12,288,254, filed Apr. 29, 2022, which is incorporated by reference herein in its entirety.

BACKGROUND

With regard to trading of financial instruments, there may be two primary modes of trading used: bilateral and central counterparty. In bilateral trading, the parties to a trade effectively negotiate the parameters of that trade between themselves. In contrast, in a central counterparty based system, the parties submit their orders to trade to an intermediary which, in typical implementations, anonymously matches those orders with suitable counter orders submitted by other parties. For either bilateral or central counterparty, electronic trading systems are available to facilitate the electronic submission of orders to trade, e.g., buy or sell, instruments offered for trading by those systems, the matching of orders with suitable counter orders, clear trades, such as via third party clearing service, e.g., CLS, as well as provide access to information regarding available offers, completed trades and other "market" information. In addition, both bilateral and central-counterparty based electronic trading systems may provide risk management, clearing and settlement services to facilitate the completion of trades and the fulfillment of the obligations of the traders per the terms of their agreements.

As used herein, an order, order to trade or trade order refers to a willingness/desire of a trader to enter into a trade/transaction, and more particularly, to an electronic request or data message transmitted to, or received by, an electronic trading system which includes data indicative thereof, such as identity of a product, desired quantity, desired price, side (buy/sell), etc. As used herein, the term trade, executed trade, completed trade, etc., may refer to an agreement between two parties, each to fulfill an obligation defined by the transaction, and may further refer to a given order and the one or more suitable counter orders with which the given order has been matched and/or further cleared and/or settled. Orders may typically be canceled or modified by the submitting trader prior to them being matched with a suitable counter order. Once executed, the trader typically must fulfill their obligation unless they transfer, e.g., sell, or offset, such as be entering into an opposing trade, that obligation to another trader prior to the date on which fulfillment of their obligation is required.

A forward contract, such as a currency forward contract, referred to as an FX forward, is an example of a contract which is traded via a bilateral trading system and calls for delivery of an asset at a later date for a price determined at the inception of the contract. In contrast, a spot contract, e.g., a spot FX contract, calls for substantially immediate, e.g., within 2 days, delivery. For currencies, an FX forward contract is a bilateral contract for delivery, actual or cash settled depending on the contract terms, of an amount of a particular currency, e.g., Euros, at a future date at a price, delineated in a different currency, e.g., dollars, determined at the inception of the contract. Unlike a futures contract, discussed below, a forward contract is traded "over the counter," bilateral, e.g., negotiated directly between the parties as discussed above, and may or may not be standardized as to its terms. Option contracts on a forward contract are also available offering the buyer thereof the right, but not the obligation, to sell or buy the underlying forward contract at a specified price on or before a certain expiration date. Forward contracts may be physically settled, e.g., via the delivery of the amount of the particular currency called for in the contract, or cash settled via delivery of the cash difference, denominated in currency of the contract price, between the contract price and the spot price of the currency to be delivered, which may be the differential in exchange rates between when the contract was entered into and the delivery date. Options contracts for the delivery of a specific currency may also be offered bilaterally and call for delivery of the requisite currency, as opposed to a forward contract therefore. Options contracts traded via a bilateral/OTC trading system may be referred to as OTC options or OTC options contracts.

As will be described, FX spot, FX forward, as well as FX futures contracts, as described below, may relate to transactions for currency pairs. A currency pair comprises the national currencies from two countries coupled for trading on the foreign exchange (FX) marketplace. Both currencies will have exchange rates on which the trade will have its position basis. The calculation for the rates between foreign currency pairs is a factor of the base currency. A typical currency pair listing may appear as, EUR/USD 1.3045. In this example, the euro (EUR) is the base currency, and the U.S. dollar (USD) is the quote currency. The difference between the two currencies is a ratio price. In the example, one euro will trade for 1.3045 U.S. dollars. In other words, the base currency is multiplied to yield an equivalent value or purchasing power of the foreign currency. The phrase "quote currency", which may also be referred to as the "term currency," means, with respect to any currency pair, the second currency of such currency pair and is the currency that is being bought or sold to another party. The phrase "base currency" refers to the first currency in the Currency Pair against which the Client buys or sells the Quote Currency. The base currency typically refers to one, meaning one single currency against a number of quote currencies. This comparison answers the question of how many quote currencies equals in value one base currency. When one is long-biased, one always buy the base currency and sell the quoted. The opposite is also true.

In contrast to bilateral trading systems, central counter party-based trading utilizes an intermediary entity/system to separate the transacting parties such that, within the system, they are prevented from transacting/negotiating directly with one another, or, in most cases, even knowing the identify of their counterparty. For example, a central counterparty based electronic trading system, such as a futures exchange, such as the Chicago Mercantile Exchange Inc. (CME), provides a contract market where financial instruments, e.g., futures and options on futures, are traded using electronic systems. "Futures" is a term used to designate contracts for the purchase or sale of financial instruments or physical commodities for future delivery or cash settlement on a commodity futures exchange. A futures contract is a legally binding agreement to buy or sell a commodity or other underlier, such as a currency, at a specified price at a predetermined future time. An option contract is the right, but not the obligation, to sell or buy the underlying instrument (in this case, a futures contract) at a specified price, referred to as the strike price, on or before a certain expiration date. An option contract on a futures contract, e.g., having a futures contract as an underlier, offers an opportunity to take advantage of futures price moves without actually having a futures position and is considered "in the money" when the strike price is favorable to the market price of the underlier. The commodity, instrument or asset to be delivered in fulfillment of the contract, or alternatively the commodity, instrument or asset for which the cash market price shall determine the final settlement price of the futures contract, is known as the contract's underlying reference or "underlier." The underlying or underlier for an options contract on a futures contract is the corresponding futures contract that is purchased or sold upon the exercise of the option. Options contracts traded via a central counterparty-based trading system may be referred to as Exchange Traded Derivative (ETD) options or ETD options contracts.

Typically, as opposed to typical bilateral contracts, e.g., forward contracts, the terms and conditions of each futures contract are standardized as to the specification of the contract's underlying reference commodity, the composition of the commodity, quantity, delivery date, and means of contract settlement. Such standardization may improve the liquidity of these contracts, e.g., the ease with which such contracts may be bought or sold. Options on futures may be similarly standardized as to, for example, quantity, strike price and expiration/maturity. The underlying reference commodity may include a range of possible qualities, quantities, delivery dates, and other attributes. For a spot market transaction, the underlying quality and attributes may be set, while a futures contract may provide predetermined offsets to allow for possible settlement of a non-conforming delivery. Cash settlement is a method of settling a futures contract whereby the parties effect final settlement, when the contract expires, by paying/receiving the loss/gain related to the contract in cash, rather than by effecting physical sale and purchase of the underlying reference commodity at a price determined by the futures contract. Options and futures may be based on more generalized market indicators, such as stock indices, interest rates, futures contracts, and other derivatives. At expiry, an option on futures, if in the money (ITM), described in more detail below, provides a cash settled payment plus the underlying futures contract, and if out of the money (OTM), it provides nothing. As will be discussed, an underlier of a futures contract may be a currency, e.g., the contract may be for delivery on a specified date of a quantity of Euros in exchange for a defined payment in U.S. dollars.

Aside from the above differences, bilateral and central-counterparty based trading systems differ in terms of who bears responsibility for counterparty risk, i.e., the risk of financial loss to one party to a trade due to the actions, inactions, or consequences thereof, such as the failure to perform on their obligations specified in the transaction, of the counterparty thereto.

In bilateral trading, each party, or intermediary agent, e.g., a prime broker or other access agent, via which that party trades, is, generally, directly responsible for the risk of loss in any given trade if their counterparty, or intermediary agent, e.g., a prime broker or other access agent, via which that counterparty trades, fails to perform. For example, in a cash/OTC market, prime brokers may create a central-counter party-like consolidation of counterparty risk to form a multi-tier structure where large participants, such as other prime brokers or very large banks, have bilateral risk. Bilateral electronic trading systems, such as the CME-EBS system described herein, may support a three tier structure where large, credit worthy entities, i.e., prime brokers, interact bilaterally and large to medium size trading entities access the market through those entities. Prime customers can also establish themselves as access agents, referred to as prime-of-prime brokers, servicing small and non-financial entities referred to as prime-of-prime customers. This model could be extended to any number of levels, but in practice three levels (bilateral, prime, and prime-of-prime) meet most business needs. As such, bilateral trading parties typically require credit verification or other guarantees, or risk mitigations, such as collateral, from their counterparties and often, as will be described, set limits on the amount of risk/exposure they are willing to undertake with a given counterparty. Such limits, which may be referred to as "hard limits," preempt transactions to prevent a limit overrun and may be applied to whether or not an order trade is accepted and/or whether or not it is executed, and/or to filter or mediate the distribution of data related thereto. In contrast, a soft limit may be applied after trade execution and therefore, more loosely enforced. Accordingly, bilateral electronic trading systems, as will be described, typically provide risk mitigations systems in the form of credit limit mechanisms, referred to as credit controls, which allow parties, for example, to define credit limits with respect to their potential counterparties which restrict the extent/magnitude of risk exposure and have the electronic trading system monitor, manage and enforce those limits on their behalf, as well as assist the parties in understanding and managing any credit limits to which they are subject. As any given party may enter into transactions with a myriad of counterparties, the number of different credit limits which a bilateral electronic trading system may have to maintain, manage and enforce may be substantial, as is the volume of transactions against which such limits must be assessed and accounted for.

In contrast, a central counterparty-based exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate counterparty credit risk on behalf of the transacting parties as well as the exchange. Clearing is the procedure through which the clearing house becomes buyer to each seller of a futures contract, and seller to each buyer, also referred to as a novation, and reduces risk of financial loss to each transacting party due to breach of contract by assuring performance on each contract. A clearing member is a firm qualified to clear trades through the clearing house.

An exchange computer system which operates under a central counterparty model acts, e.g., using the clearing mechanism described above, as an intermediary between market participants for the transaction of financial instruments and assumes the counterparty risk to each. In particular, the exchange computer system interposes itself into the transactions between the market participants, i.e., splits a given transaction between the parties into two separate transactions where the exchange computer system substitutes itself as the counterparty to each of the parties for that part of the transaction. In this way, the exchange computer system acts as a guarantor and central counterparty and there is no need for the market participants to disclose their identities to each other, or subject themselves to credit or other investigations by a potential counterparty. For example, the exchange computer system insulates one market participant from the default by another market participant. Market participants need only meet the requirements of the exchange computer system. Anonymity among the market participants further encourages a more liquid market environment as there are lower barriers to participation. The exchange computer system can accordingly offer benefits such as centralized and anonymous matching and clearing.

Accordingly, in central counterparty based systems, generally, there may be no need for one party to be concerned about the credit worthiness of another party and so such credit verifications or counterparty credit limits may be avoided. However, the electronic trading system may or central counterparty, itself, impose credit verifications and limits and other risk mitigations. For example, a central counterparty based system may require traders to post a performance bond, or margin, in an amount set to cover the potential risk of loss of a trader's current positions. This performance bond may be adjusted on a periodic, e.g., daily, basis to account for the trading activities of the trader and the then current market value of their positions. In addition, where market participants transact in the trading system on behalf of other parties who may be financially responsible for the activities of those traders, the electronic trading system may permit the responsible party to specify limits, as will be discussed below, on the number or magnitude of open orders or completed trades, such as a margin limit.

While a central counter party-based trading system may offer certain advantages, such as anonymity and risk management, bilateral trading may still often be utilized in situations where the parties prefer not to use a central counterparty, e.g. due to cost, efficiency or other concerns, where the parties wish to complete a transaction as quickly as possible, and/or for non-standard transactions or unique transactions where the transaction terms are not standardized and/or the number of potential suitable and/or interested counter parties may be limited. For example, currency exchange transactions, such as transactions in non-deliverable currencies, foreign exchange forward or swap agreements, are typically entered into as bilateral transactions.

An example of a central counterparty based electronic trading system is the Chicago Mercantile Exchange Inc. (CME) futures exchange, referred to herein also as an "Exchange", which provides a contract market where financial products/instruments, for example futures and options on futures, are electronically traded. An example of a bilateral electronic trading system is the EBS Direct Platform provided by CME Group, Inc., which is a wholesale electronic trading platform used to trade on the foreign exchange market (FX) with market-making banks.

The CME futures exchange may be referred to as an Order Driven Market (ODM) in which traders submit, with some limitations, arbitrary orders to buy or sell which are matched with previously received suitable counter orders, stored in an order book database, also referred to as a central limit order book (CLOB), or, otherwise, advertised to the market participants in order to attempt solicit a suitable counter order. In contrast, the EBS Direct Platform may be referred to as a Quote Drive Market (QDM), also referred to as a price driven market, which limits trading to binding quotes provided by designated participants, e.g., market makers or dealers, etc. Whereas an ODM may be more transparent, providing visibility, e.g., via an order book database, to all individual market orders to trade, a QDM provides liquidity by guaranteeing quoted prices. That is, in an ODM, a trader may place an order to buy or sell at a desired price but there is no guarantee that another trader will place a suitable counter order thereto to be matched by the ODM's electronic matching engines and traded. In a QDM, orders placed in the QDM's electronic quote matching systems against a submitted quote are essentially guaranteed to be fulfilled but quotes available at different prices may be limited. Other types of markets, including hybrid ODM-QDM markets, may also exist.

More particularly, a QDM may be considered a relationship-based model where there is limited anonymity-participants know their counterparty prior to transacting. Generally, in a QDM, participants play one or both of two discrete roles, liquidity providers (LP) and liquidity consumers (LC). These roles are fundamental, but can be blurred by some platform features. In an ODM, the participants are more equal where in the general case any participant can be a provider or a consumer. In a QDM, an LP prices their market data based on a priori evaluation and classification of consumers. In ODM, makers submit their orders that are priced without knowledge of the potential counterparty to a trade. Another difference is that in a QDM, LP's submit market data and consumers submit orders against that market data (the QDM platform often will aggregate and filter provider market data). Another way to consider these types of platforms it to consider business usage. For very liquid instruments that have efficient pricing (tight spread with reactive/volatile pricing). a central limit order book (CLOB) or ODM platform may provide the safest venue for exchanging risk due to efficient price discovery and collective wisdom of the market to set the price. When an instrument's price is very stable (not volatile) and/or market liquidity is thin (manifesting a wide bid/offer spread in a CLOB for example), a QDM platform may be preferred because the foreknowledge of one's counterparty allows quoting a tighter spread with greater safety and the consumer being able to know their provider allows certainty of fairness. When an instrument is very illiquid and/or specialized to the point that a provider can't safely provide a continuous price to a collection of similar consumers, then bespoke pricing method become helpful—these are referred to as request for quote or request for stream. Consumers ask for a price in an instrument and provider with knowledge of the consumer and current market conditions can elect to provide a price or stream of prices to the consumer. Knowledge of counterparty and full consideration of current conditions replace the wisdom of the market that would be present in a CLOB. RFQ/RFS is the oldest form of trading. "How much do you want for that? Or How much will you give me for this?" RFQ/S systems often support haggling or negotiated pricing features.

Current financial instrument trading systems allow traders to submit orders and receive confirmations, market data, and other information electronically via an electronic communications network at one or more execution venues, e.g., which implement/provide ODM and/or QDM type markets. These execution venues may be geographically dispersed for the convenience of the traders or operator thereof and/or so as to be located geographically, i.e., in particular geographic regions, and/or logically, close to traders in order to, for example, minimize latency therebetween. An execution venue may refer to a physical and/or logical location at which data messages comprising orders to trade are considered to have been received by an electronic trading system and accorded priority against other such data messages subsequently received thereby which are competing for the same trading opportunity, i.e., where the trading system applies determinism to the received order, or where the orders to trade or received data messages are actually matched with a suitable counterparty forming a binding trade.

An execution venue may further refer to a geographic and/or logical location from which market data messages indicative of market activities/events are transmitted, i.e., released on to a network for transmission to recipients and no longer under the control of the electronic trading system, to at least a subset of market participants.

An execution venue may comprise the electronic networking and transaction processing components necessary to couple the electronic trading system with a network external thereto, e.g., the Internet, process received electronic transactions and transmit market data messages, or may comprise only the electronic networking components necessary to couple the electronic trading system with the network, ascribe priority to received data messages and relay, such as via a public and/or private electronic communications network, those received prioritized transactions to transaction processing components located remotely therefrom. As will be described in more detail herein, an execution venue may be a geographic and/or logical location where a limit on credit/risk is enforced and/or consumed.

In many cases, traders are subject to limits, i.e., credit or risk limits, on the trade orders that they can submit to, or have executed by, these execution venues. The terms credit limit, risk limit and limit may be used interchangeably herein. A credit or risk limit may be a specification or allocation of a finite amount of resources, e.g., money, placed at the disposal of a trading entity to be used by that trading entity, e.g., in lieu of their own resources (or lack thereof), to engage in transactions which may incur costs, particularly if those transactions create obligations that the trading entity is unable or unwilling to meet. Alternatively, or in addition thereto, a credit or risk limit may be a measure of, as well as a method of accounting for and/or regulating, such activities.

Such limits may generally relate to risk, i.e., the risk of loss should the trader fail to be able to meet their obligations required by the positions they hold. Such limits may, for example, account for pre-trade (submission of an order) or post-trade activities (execution of a trade). For example, if a trader holds a position in a futures contract obligating them to sell a quantity of an underlier to a buyer on a future date for a set price, there is a risk that at that future date the trader will be unable to provide the requisite quantity of the underlier to the buyer, e.g., because they went bankrupt. There is similar risk that the buyer will be unable to pay the seller at that date.

Hard limits may be assessed based on pre- or post-trade activities. As used herein, pre-trade activity refers to other orders that have been previously accepted but not necessarily traded/executed or canceled. Post-trade activities refer to previously accepted and executed trades, i.e., the positions/obligations created thereby. Herein, the disclosed credit controls may be used for controlling/determining whether a newly submitted trade order will be accepted or not (hard limit), as opposed to whether an already accepted or executed trade should be subsequently rejected or unwound (referred to as a soft limit).

For example, limits based on pre-trade activities may protect a trader from being subject to obligations that they, or the entities responsible for their actions, did not intend by limiting the number of orders a trader is allowed to submit to the execution venue, regardless of whether those orders would be traded or not based on the current state of the market. Limits based on pre-order activities may look only at the exposure the trader has with respect to pending/resting orders that have yet to be executed or canceled. For example, a trader may submit multiple orders at different price levels where no current counter orders are presently resting, either accidentally or intending, upon one or more of those orders trading, to cancel the remaining resting orders. However, if the trader cannot react fast enough to market events, some or all of those orders that they never intended, or intended to cancel, may trade before the trader can cancel them, subjecting that trader, or the entity responsible therefore, to additional obligations they may not be able to meet. Limits based on pre-trade activities may act to limit such exposure, i.e., how much a trader and be exposed at any given time. Such limits may also act to limit the rate at which a trader can submit trade orders, such as with respect to the rate at which those orders are executed.

Post-trade limits may protect a trader from submitting orders when they, or the entity responsible therefore, are already committed to a certain level of obligations. For example, such limits may prevent a trader from undertaking additional risk of loss when the risk of loss of the positions they already hold meets or exceeds a threshold.

It will be appreciated that some execution venues may impose other mechanisms, such as soft credit limits, margin or performance bond requirements, which require a trader to post collateral or other assets to cover the risk of loss of the positions the currently hold. As opposed to preventing a trader from entering into a position, such mechanisms are different in that they are computed after a trade is executed to determine the required amount of the margin or bond that needs to be posted to cover a potential loss in the case where the trader is unable to perform their obligations. These mechanisms largely protect the execution venue, particularly those venues which implement a central counter party based anonymous trading system, and ensure that any counter-parties are protected and insulated from the other party's inability to perform at settlement. Further, margin does not act to protect a solvent entity from undertaking more obligations then they desire, e.g., where a trader, working for a solvent entity responsible for that trader's activities, enters into more positions than the responsible entity desires. Furthermore, in bilateral trading, which may be centrally cleared or otherwise, parties to a transaction generally directly enter into transactions with one another and may, due to the lack of margin or similar risk of loss mitigation mechanisms, be largely unprotected from losses incurred when their counter party is unable to perform. Accordingly, as was described above, one party may set limits on the individual and/or combined value of the transactions they enter into with a given counter party in order to minimize losses due to that counter party's failure to perform. Such limits may be set based on a relationship or history between the party and counter party.

Limits based on both pre- and post-trade activities, which may take the form of credit or risk limits, may, for example, minimize order entry errors and/or credit risk and may prevent a trader from over-extending themselves. These limits may be defined by the brokers or other entities which oversee or are otherwise responsible for the actions of the traders, by counterparties that the traders are likely or intending to trade with, and/or by the operator(s) of the execution venues themselves. As such, any given transaction submitted by a trader may be subject to multiple different credit limits depending upon the particular execution venue, particular responsible entity, and/or particular counterparty. The execution venues may enforce these credit limits by implementing credit control mechanisms which account for submitted and/or completed trades against any remainder of an applicable limit and reject orders to trade, or take other actions, when the applicable limit is, depending on how the limit is ascribed and usage is accounted for, exhausted, met or exceeded. In some cases, a particular trader, or particular transactions thereof, will not be subject to any limit, or an applicable limit may be defined as unlimited, or otherwise set so high as to be effectively unlimited. Similarly, to prevent a particular trader from trading, or submitting particular transactions, no limit may be specified, the lack thereof preventing such transactions, or a limit of zero may be specified.

However, where traders subject to an overall limit, e.g., a credit/risk limit, which may also be referred to as a total limit or global limit, or pool of limits, on their activities or subsets thereof, i.e., trade order submissions, at multiple different, and particularly geographically and/or logically dispersed, execution venues, each execution venue needs to check and account for each trade against any such applicable limits before accepting and/or completing that trade. Such checks, which require the systems to electronically communicate over a communications network with each other, with respect to the trading process, may suffer from, or otherwise introduce, latency issues which may unduly delay trade transactions and/or result in the unnecessary rejection of otherwise valid trade orders, or otherwise enable a trader, unwittingly or not, to exceed an applicable limit to the detriment of the entity which set that limit.

DETAILED DESCRIPTION

Figure 1:
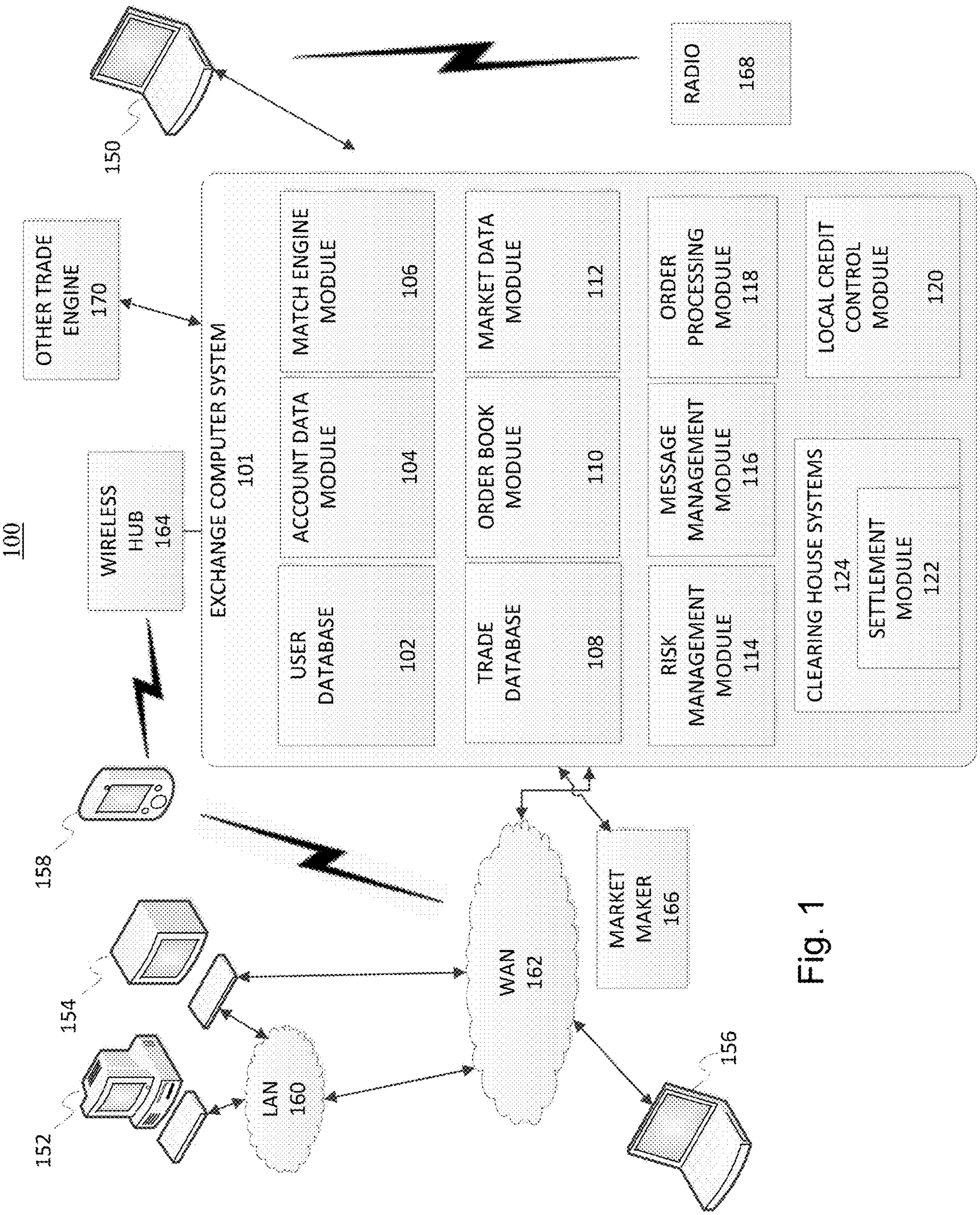
FIG. 1 depicts an illustrative computer implemented execution venue that may be used to implement aspects of the disclosed embodiments.

The disclosed embodiments relate to systems/methods for low latency regulation of distributed, e.g., geographically and/or logically, transaction processing, such as trading of financial instruments, in accordance with centralized demand-based dynamically reallocated post-trade-based limits, e.g., credit/risk limits. In particular, the disclosed embodiments relate to monitoring credit demand across execution venues, as opposed to actual utilization, and, based thereon, modifying execution specific limits to reallocate portions of a credit/risk allotment, such as a credit/risk limit, to multiple execution venues for use in approving transactions, which may implement order driven and/or quote driven markets, so as to dynamically rebalance the allocations to the execution venues based on demand/need, rather than utilization, thereby avoiding having to mitigate latencies in determining and responding to utilization. In addition, the disclosed embodiments may maximize the total available amount for reallocation by recognizing inter-execution venue limit offsetting positions, i.e., trades, during the rebalancing process.

As discussed above, credit/risk limits are typically applied by an electronic trading system at three points with respect to the life cycle of a trade, upon order submission, upon trade execution, and/or with respect to the advertisement of trading opportunities and solicitation of suitable counter offers. At the time of order submission, a limit may be applied to determine whether or not that order can be accepted, regardless of whether or not it would, upon acceptance, match with another order and executed. Such limits can be implemented when, for counter party limits, the counterparty is known prior to order submission time, e.g., in a bilateral transaction, and, for self-imposed limits, when the participant intends to protect themselves from overly large positions regardless of counterparty. From a venue/platform perspective, this type of limit is important as it prevents untradeable order inventory, i.e., orders that are guaranteed not to execute and therefore will simply rest on the order book and be advertised to the other market participants, from being advertised in market data, potentially leading to a disorderly market and false trading signals, e.g., limits at order submission may help to avoid problems such as "risk-free market spoofing." Self-imposed limits are important to protect participants from, for example, errant human traders or errant automated trading systems, as well as unintended collective behavior of multiple traders or automated systems that would create excessive directional (net) or volumetric (gross) positions. When an order is accepted, it is typically accounted for against the applicable limit by reserving an amount of the available credit where that reserved amount may be relinquished or modified should the order be canceled or modified prior to execution. The reserved amount of credit is considered consumed or committed only when the order is executed. As is noted elsewhere, reserved credit cannot be offset by a counter order or counter position as it may be seen that no actual risk has yet been undertaken which can be counter balanced. This type of enforcement may apply to the cleared context, such as futures and options, and to prime broker party structures, such as in cash/OTC markets, such as EBS platform. Self-imposed limits may be applied to any market context or party structure. An additional benefit for participants of this type of enforcement is early feedback which occurs when an order, which cannot be executed due to risk limits, is immediately rejected at the time of submission rather than at the later execution time. In this case, the participant may adjust their trading strategy or method quickly as opposed to having interest held indefinitely without execution.

At the time of trade execution, the application of credit/risk limits prevents creation of trades between parties that have insufficient risk limits between each other. Such limits are generally applicable to bilateral markets and bilateral participants. Where sufficient credit is available, the accounting for the executed trade against the available limit can involve a reservation of a credit amount where the trades are pending during distributed confirmation (as would be the case in a QDM) or an immediate commit/consumption of the credit amount (as would be the case with an ODM).

At the time market data is generated, transmitted to market participants and/or presented to a particular market participant, limits may be applied, particularly for bilateral traders/markets, to prevent, i.e., filter, the advertisement of inventory, e.g., pending available orders, that is not tradeable by an observing participant.

While the disclosed embodiments will be described with respect to a single credit/risk limit applied to a single trader, it will be appreciated that the disclosed embodiments may implement multiple different credit/risk limits for the same or different trading entities, each of those credit limits being applicable to different transaction types, trades between the trader and a particular counterparty, or other category or classification relating to a type of trade, traded product, trade participants, or other activities or combinations thereof. That is any one of a plurality of trading entities may be subject to one or more credit limits specified by another trading entity who may be a future counter-party, a supervisory entity overseeing, or otherwise supporting or responsible for, the activities of the trading entity, an operator of one or more execution venues, or combination thereof. Any one of those credit limits may be applicable to all or only a subset of the trades made by the subject trading entity, where the subset may be defined based on trade type, underlier, counterparty, execution venue to which the trade was submitted, or any other criteria, or combination thereof. It will be appreciated that the criteria defining which trades are subject to a particular credit/risk limit may overlap such that any one trade may be subject to multiple different credit limits. In such a case, the disclosed embodiments may operate to cause a trade to be rejected if any one applicable limit is, depending upon the implementation, exhausted, met or exceeded. Alternatively, the disclosed embodiments may operate to cause a trade to be accepted if any one applicable credit limit is, depending upon the implementation, not yet exhausted, met or exceeded. In one embodiment, a trading party may define a risk limit with respect to their transactions with a particular other potential counterparty. A given trading party may define same or different risk limits for all, or subsets, of their potential counterparties, and each counterparty may do the same. This may result in a matrix of limits where a transaction between any two parties may be subject to one or more limits specified by any one, or all, party with respect to the other party.

In addition, how and when a given trade order is accounted for against a given credit limit may vary. In some implementation, a trade order may be counted against a limit, e.g., by deducting an amount from the available balance, at the time trade order is submitted, such as in an ODM type market. In other implementations, the trade order may be counted against a limit only when executed, such as in a QDM type market. The disclosed embodiments contemplate either implementation as well as other implementations now available or later developed.

Furthermore, the amount of available credit balance that is consumed by a given trade order, either when received or when executed, may also be implementation dependent and may vary and in one embodiment may be based on the notional value of the resulting position/obligation that is or will be created for the trader.

Furthermore, depending upon the implementation, an execution venue may be implemented so as to require at least some available portion of an applicable limit in order to permit any transaction to proceed. In such implementations, a trader, or transaction thereof, which is effectively not subject to a limit may be ascribed a limit defined as unlimited or otherwise set to a value substantial enough as to be considered unlimited, e.g., set so high as to be substantially inexhaustible. Similarly, to specifically prevent a trader from submitting a transaction, an applicable limit of zero may be specified. In other implementations, where an applicable limit is undefined or not provided, the execution venue may be implemented so as consider there to be no limit on that trader or transaction, or alternatively, to consider the undefined limit to be zero and block the trader or transaction.

Credit or risk, as well as the limits thereon, may be measured in units, dollars (or other currency), or other metric depending upon the implementation. The amount of risk accorded to a given transactions, and accounted for against a given limit, is similarly implementation dependent but, in one embodiment, may be based on the notional value of the particular resulting position/obligation, i.e., the pecuniary amount of the trader's obligation. In one implementation, the risk accorded to each transaction undertaken by the trader may be deducted from an initial allocated limit amount/allotment, or added back for exited positions, wherein when the amount reaches zero or is otherwise depleted or insufficient for a subsequent transaction, the limit is determined to have been met or reached. Allotted credit may be reduced or increased by altering the allotted amount. Alternatively, credit or risk limits may be accounted for by accumulating, or deducting, risk amounts associated with positions undertaken, or exited, by the trader and comparing the accumulated or reduced amount of risk to a threshold limit value, and where when the accumulated amount of risk meets or exceeds the threshold limit, the limit is determined to have been met. In such an implementation, allotted credit may be reduced or increased by modifying the limit/threshold value. It will be appreciated that whether a credit/risk limit is accounted for by accumulating, until a threshold limit is reached, or deducting, until an allotment is exhausted, per-transaction amounts is implementation dependent and both methodologies are contemplated herein.

Where insufficient credit is available for a given transaction, but the available amount is not zero, the limit may only be considered to have been met/reached with respect to that present transaction which may, accordingly, be rejected. However, subsequent transactions, for which that available amount is sufficient, may be approved. In one embodiment, as will be described below, where non-zero available credit is insufficient to cover a particular transaction, that transaction may be automatically modified, e.g., to reduce the quantity of the trade order or otherwise reduce the notional value and corresponding required credit, so as to be within the available remaining limit.

In some implementations, the rate of consumption of an available limit may be monitored, in addition to or in lieu of monitoring the magnitude of consumption as described. In this implementation, when the rate, or the change in rate, of the consumption of the available limit exceeds a threshold, such as when the available limit is being consumed too quickly or the rate of consumption is accelerating too quickly, the system may act to, for example, reject a subsequently submitted transaction, or otherwise throttle or regulate transaction approvals. Such a scenario may indicate problem such as with an automated trading algorithm.

As used herein, execution venues and/or other components of the disclosed embodiments may be geographically/physically and/or logically separated from one another introducing latency therebetween, i.e., they may be separated geographically/physically, e.g., located in different physical locations or geographic regions, and/or logically separated, e.g., by one or more interconnecting communications media or other intervening components, such as relays, gateways or switching devices. For example, a communications path comprising numerous intervening gateways or switching devices may be characterized by more latency than a longer communications path having fewer such intervening components. More particularly, the distance/length/latency of a given data/communications path interconnecting any two of the described components or other intervening components, whether those components are themselves physically close or not, may introduce latency in the electronic communications therebetween. Further, any asymmetries in the distance/length/latency between the interconnecting data/communications paths, or the number or type of intervening components, whether or not they interconnect the same source and destination end points, may introduce similar asymmetries in the latencies of the electronic communications communicated therethrough.

Systems for monitoring and enforcing credit or risk limits with respect to transactions undertaken at execution venues may be referred to as credit controls or credit control systems/mechanisms.

In prior systems, generally, for example, where a single total limit is to be applied against transactions occurring at geographically (regionally) and/or logically disparate execution venues, a single centralized credit monitoring and enforcement system may be implemented which manages the credit limit and whereby upon receipt of a proposed trading transaction, each execution venue communicates with the centralized credit monitoring and enforcement system, e.g., over an electronic communications network coupled therewith, to submit the particulars of the trade thereto for evaluation against the current limit and receive a signal therefrom approving or rejecting the transaction, the central system then, upon approving a transaction, adjusting the remaining credit amount to account for the approved transaction. This may be referred to as centralized credit controls. While such an implementation may ensure that the credit limit is not exceeded, referred to as "overrun," the delay introduced into the transaction process, or asymmetries therein, due to the round-trip latency of submitting the transaction for approval and receiving the result thereof before the transaction may be processed, may be unacceptable.

In particular, for example, where different execution venues are constantly receiving incoming transactions, many competing for the same trading opportunity, delaying the processing of those transactions, or delaying some more than others, to await the result of a credit/risk limit check may unduly slow down the entire system or unduly penalize some transactions which, due to asymmetric delay, may miss out on competitive trading opportunities. This may be particularly acute where some traders are subject to limits and others are not or where some traders are placing trades at execution venues located geographically and/or logically further from the centralized credit control system than other execution venues. For example, to support real time trading at an execution venue, i.e., where credit/risk based transaction approval/rejection decisions are made substantially contemporaneously by the execution venue upon receipt of transactions thereby, 1 millisecond or even sub-millisecond latency thresholds may need to be met which may be physically impossible with centralized credit controls simply due to the propagational delays imparted by the logical and/or physical distance between the centralized system and the venue. It is desirable that any delay caused by a credit decision process not exceed the reaction time with which traders can submit trade orders to an electronic trading system, e.g., responsive to changes in the market implemented thereby, referred to as a tick-to-trade latency.

In an alternative prior implementation, each execution venue may be implemented with its own credit monitoring and enforcement system to minimize credit decision latency, each of which is allocated with the entirety of the overall credit limit so as to avoid the risk of an overutilized venue running out of credit, where the venues may then coordinate credit usage among themselves or via a central authority system. This may be referred to as decentralized credit controls. While such an implementation may resolve any latency issues with respect to the transaction approval process, the apportionment of the entire credit limit to more than one venue creates a substantial risk of overrunning the credit/risk limit due to, for example, simultaneous in-flight transactions, or other communications anomalies, where the execution venues are unable to coordinate the consumption credit thereby at a rate commensurate with the rate at which transactions may be submitted and/or processed by the execution venues.

In yet another alternative prior implementation, each execution venue may be implemented with its own credit monitoring and enforcement system to each of which is allocated only a portion of the overall credit/risk limit, the total amount allocated not exceeding the overall limit, so as to minimize latency and avoid the risk of overrunning the overall limit, i.e., due to in-flight transactions or other communications anomalies. This may also be referred to as decentralized credit controls. However, the apportionment of the credit limits creates the risk that over-utilized execution venues may exhaust their apportioned amount and under-utilized execution venues may be accorded an excess amount which goes unused. This inefficiency, which may be referred to as "underrun," may result in transactions being rejected at the depleted venue even though the overall limit has not been exhausted/met/exceeded.

To address the inefficiencies created by limit apportionment, U.S. Pat. No. 11,222,294, herein incorporated by reference, proposes yet another implementation of distributed credit controls which includes a master node and a plurality of regional nodes communicatively coupled to each other over a network and programmed to perform a method for updating limits for each of the regional nodes, where the master node maintains a global limit and a ratio representing a proportion of the global limit allocable to each of the regional nodes. The master node allocates to each regional node a local limit that is a proportion of the global limit in accordance with the ratio, and monitors the actual local limit utilization at each of the regional nodes. When the master node detects one or more events, such as a change in the actual limit utilization at a regional node, the master node allocates a new local limit to one or more of the regional nodes. The master node can receive the client limits and divide and distribute the limit across the various regional nodes. In this way validation can occur regionally instead of centrally, retaining latency benefits. Additionally, unlike the replication approach there is no possibility of in-flight risk and overrunning the overall credit limit. The master node can split the limit across the various nodes using a parameter called the Split Ratio. The parameter can be defaulted such that the limit is split equally across each node. In certain embodiments, the parameter can be altered manually per client so that a greater proportion of the limit is allocated to a particular node, where the majority of trading may occur for that client. The master node can be configured to continuously monitor the actual usage of the client limit in each regional node, in real-time without user intervention. If and when a particular node begins to disproportionately consume its available limit, compared to other nodes, the master node can rebalance the available limit across the nodes. The master node can attempt to keep the available limit on each node in the same proportion as the Split Ratio, by borrowing availability from low utilization nodes and granting to high utilization nodes. Any adjustments to the Split Ratio can also result in a rebalance. This process can be controlled and tuned such that rebalancing occurs at a frequency that ensures maximizing limit usage while reducing the overhead of excessive updates where the rebalancing will provide marginal benefit.

However, the centralized monitoring of actual utilization at each regional node requires that each regional node periodically, or in real time, communicates its current utilization to the master node. This presents another latency issue where the regional nodes is processing incoming transactions at a rate which exceeds the utilization reporting latency resulting in the reporting of that node's current utilization being inaccurate. For example, the current utilization may change just after the regional node transmitted a utilization reporting message to the master node, i.e., while the reporting message is in flight, resulting in the master node receiving an outdated reporting. Regardless of whether the regional node follows with an updated reporting of utilization, there can be no guaranty that the utilization value received at master node is the same as the current actual utilization at the time of receipt. Furthermore, any asymmetries in the latencies between the master node and different regional nodes may further corrupt the rebalancing of limits.

In addition, redistributing limit allocations based on predetermined utilization ratios ignores actual/real-time demand. Accordingly, such a system may not react to dynamic shifts in credit demand between different regional nodes without intervention to alter the predetermined ratios.

Furthermore, the above implementation is described with respect to a monitoring system which controls the submission of trade orders thereto in accordance with predetermined limit allocations based on actual utilization of those allocations. That is, the above system implements credit controls, such as to determine whether an overall margin limit may be exceeded before a particular trade order is forwarded to an exchange for execution, but this implementation, being based on utilization only, does not account for the actual completion of a given trade where the trader is bound to undertake the obligation thereof. Accordingly, the above prior implementation does not and cannot take into account offsetting positions (trades) entered into by a trader, at least across different venues/regional nodes, which may reduce the trader's overall risk of loss and which, in order to maximize efficient utilization, should be reflected in a reduction of limit utilization or otherwise an increase limit availability.

More particularly, when limits are accounted for based on post-trade activities (trades), i.e., limits on the total risk associated with positions resulting from completed trades, it is both possible and desirable to account for those positions held by a trader/trading entity which may offset the risk of other positions held by the same trader/trading entity. For example, where a trader holds opposing positions, e.g., a position to sell, referred to as a short position, a quantity at a price and a position to buy, referred to as a long position, that same quantity at that same price, the net risk is effectively zero as their obligations cancel each other out and, accordingly, such positions should not, in aggregate, be accounted against any applicable limit on the amount of risk that the trader may undertake. A trader/trading entity holding opposing long and short positions is referred to as holding a "flat position." As opposed to pre-trade activities, post-trade activities may be netted or otherwise offset against each other as the risk of the actual positions may be determined, realized and accounted for. However, pre-trade activities, such as the mere submission of an order to trade, represent only hypothetical obligations as those orders may not be matched and traded against a suitable counter order so as to create a position which actually obligates the trader and generates a risk of not meeting that obligation. Limits accounting for pre-trade activities may also be imposed to prevent a trader from making more offers/orders than they intend to have matched but these limits cannot recognize offsetting offers/orders that have yet to be executed. As used herein, orders refers to non-nettable transaction submissions while trades refer to nettable executed transactions. Both orders and trades may be accounted for against a given limit depending upon the implementation, e.g., ODM electronic trading systems may account for orders against a given applicable risk limit whereas QDM electronic trading systems may only account for trades against a given applicable risk limit. An ODM, and CLOB, do not generally have (or need) the ability to support a distinction between pending and completed trades. However, QDM systems often must support "last look" of proposed trades where the liquidity providers can reject a trade (for various reasons). During this last look period on the QDM platform the trade may be reverted and is referred to as a "pending trade". From a credit perspective, pending trades reserve credit in the same way that an order would reserve credit on ODM and pending trade utilization may be considered a "working position" that is not-offsetable like order utilization.

The disclosed embodiments apply and enforce limits which account for post-trade activities and, accordingly, implement netting/offsetting of positions so as to maximize utilization of the available applicable limit. As will be described, offsetting positions may be recognized both among the trades executed at a particular execution venue, referred to as local netting, and, as will be further described, across multiple execution venues, referred to as global netting. Uniquely, the disclosed embodiments implementation of global netting enables the disclosed embodiments to maximize the utilization efficiency of a given risk limit across all execution venues. Furthermore, as will be described, the disclosed embodiments implement a process by which positions being reviewed for offsetting are prevented from being modified during this review process, i.e., by transactions submitted while the global offsets are being determined. In addition, any recognized offsets may be particularly allocated back to the execution venues where the offset positions are maintained. This eliminates the possibility of allocating additional credit, and create the potential for a limit overrun, when, for example, positions may be closed out before the offsetting process is complete, eliminating the offsetting scenario and, thereby, the basis for allocating additional credit, etc.

The disclosed embodiments mitigate the issues described above with respect to decentralized credit controls by implementing a centralized mechanism to monitor demand for credit, rather than utilization, and rebalance the apportionment of an available limit among the execution venues based on that demand, as will be described, which prevents limit overruns while maximizing the available amount for reallocation and minimizing delay in supplying additional allocations to those venues which require it.

Systems and methods for controlling use of one or more credit/risk limits (a set of separate independent limits being referred to as a credit pool) in connection with electronic trading in multiple product groups and across multiple execution venues are described. The systems and methods address technical problems in controlling credit/risk limit utilization that arise from trading involving a set of execution venues/match engines disposed in a distributed network. For instance, the distributed network may be arranged such that execution venues are located in New York, London, and Tokyo. At any one point in time during a day, one of or more of the execution venues may be responsible for matching orders and executing trades in a respective product group. Despite the multiple venues, electronic trading nevertheless allows any one market participant to place orders for products in different product groups virtually simultaneously. The disclosed systems and methods limit and otherwise control the utilization of credit/risk limits in those and other electronic trading scenarios.

Electronic trading enables participants to trade products at multiple execution venues, often within microseconds to milliseconds of each other. This aspect of electronic trading leads to possible overruns when a single limit/amount of granted credit/risk nears full allocation. For example, a trader with $4 m in available credit can take a $2 m position in one venue, and a $3 m position in another venue, within microseconds of each other. Without the disclosed systems and methods, the trader will be allowed to take both positions despite that, in the aggregate, the trader has now exceeded the total credit available. In these and other ways, the disclosed systems and methods allow for the geographic distribution of venues without the latency risk inherent in other systems.

Previous credit control systems react to credit overruns, or slippage, after execution of the trade(s). Either the total credit available is adjusted upward by the creditors, or the market participant is forced to exit from one or more of the positions. In some cases, addressing slippage post-hoc is problematic because the amount of slippage may be significant. For instance, a trader with $100M in available credit may easily take two $95M positions almost immediately. Slippage may thus approach 100% of available credit, multiplied by the number of active execution venues, or match engines, in the worst case scenario.

The disclosed systems and methods prevent slippage by decentralizing, or distributing, credit control functionality across the set of execution venues, referred to as "inline credit controls". An inline credit controller is disposed at each execution venue, e.g., disposed within or otherwise coupled with the order entry gateway and/or match engine(s) and configured to provide in-line credit control as described herein.

Slippage is also prevented because each inline credit controller is effectively allocated only a portion of the total credit/risk limit available. As described herein, credit/risk may be allocated on a product group, submitting/responsible trading entity, counterparty, and/or execution venue basis. The respective execution venue is provided with allocation data indicative of the limit allocation prior to order arrival, i.e., a pre-allocation of available credit/risk. As a result, when an incoming order arrives at the execution venue or associated match engine, the use of the credit limit is limited to the respective allocation applicable to that order.

The disclosed systems include a processor to determine the allocations. The processor may be centralized despite the distributed nature of the credit controllers. The processor may thus be configured for cross-venue credit control and accordingly considered part of a cross-venue risk management module or system. For instance, the processor may be part of an exchange computer system at which risk and other management functionality is provided. The processor may monitor a number of trading activity and market data parameters to determine the allocations.

The disclosed embodiments are useful in connection with any security, derivative, or other financial product traded via any equity, options or futures trading system, e.g., exchange, Electronic Communication Network ("ECN"), Alternative Trading System ("ATS"), or market now available or later developed, e.g. cash, Futures, etc., as well as any instrument traded thereon. The disclosed embodiments may thus be used in connection with a variety of different trading environments, such as an exchange as described herein, or other environments that implement one or more economic markets where rights and obligations may be traded.

The trading environment to which the disclosed embodiments are applied may be characterized by a need to maintain market integrity, transparency, predictability, fair/equitable access and participant expectations with respect thereto. For example, an exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner and without unknown or unascertainable risks. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g. that transactional integrity and predictable system responses are maintained. Electronic trading systems ideally attempt to offer an objective, efficient, fair and balanced market where market prices reflect a true consensus of the value of products traded among the market participants, where the intentional or unintentional influence of human interaction is minimized, if not eliminated, and where unfair or inequitable advantages with respect to information access are minimized if not eliminated.

These and other aspects of the electronic trading environment present technical challenges and other problems that are addressed by the disclosed embodiments. For instance, the technical problem of slippage in credit control exclusively arises from the computerized and distributed nature of electronic trading. Because products may be traded in different venues, combinations of trades may exceed the total credit available when a purely centralized credit monitoring system is used. In contrast, slippage is prevented via the decentralization of the credit control functionality and limit apportionment thereto and other aspects of the disclosed systems and methods. The decentralized nature of the disclosed systems and methods is thus at least a technical solution to electronic trading slippage in credit control.

Other technical problems are addressed by the disclosed systems and methods. For instance, the manner in which credit/risk is controlled at each execution venue in the disclosed systems and methods improves processing times. The disclosed systems and methods remove the need to check in with a centralized credit monitoring system or device with each incoming order or after each trade. Such in-line, local credit control processing of the disclosed systems and methods may introduce zero perceptible delay in order processing. Furthermore, the disclosed systems and methods avoid introducing any delay upon completion of a trade because all of the credit control processing has been implemented up front, e.g., before entry into the order book.

Another example of a technical problem addressed by the disclosed systems and methods involves latency effects encountered during adjustments to the credit allocations. With each update to the credit allocations, there is a period of time during which a portion of the credit available may be moving from one venue (or match engine) to another. That portion of the credit is thus unavailable for use during the transmit time. Despite the shortness of the transit time (e.g., a few milliseconds), the disclosed systems and methods may be configured to minimize the amount of time that credit is unavailable. The frequency of reallocation may thus be optimized, customized, or otherwise adjusted to a suitable level. Different frequencies may be used for different product groups and/or different levels of market activity. In this way, the disclosed systems and methods may be suitably responsive to changing market conditions. Moreover, even when latency results in an improper rejection of an order (e.g., because the re-allocation of credit has yet to arrive at the venue), referred to as an "underrun," the result is preferable to the opposite, i.e., slippage or overrun, when credit is improperly extended.

A brief introduction to matching, particularly in an ODM, is now provided. Some products on an exchange are traded on an electronic trading platform (e.g., an electronic exchange), also referred to herein as a trading platform, trading host or Exchange Computer System, where market participants, e.g. traders, use software to send orders to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). The Exchange Computer System, as will be described below, monitors incoming orders received thereby and attempts to identify, i.e., match or allocate, one or more previously received, but not yet matched, orders, i.e., limit orders to buy or sell a given quantity at a given price, referred to as "resting" orders, stored in an order book database, where each identified order is contra to the incoming order and has a favorable price relative to the incoming order. An incoming order may be an "aggressor" order, i.e., a market order to sell a given quantity at whatever may be the resting bid order price(s) or a market order to buy a given quantity at whatever may be the resting ask order price(s). In particular, if the incoming order is a bid, i.e., an offer to buy, then the identified order(s) will be an ask, i.e., an offer to sell, at a price that is identical to or lower than the bid price. Similarly, if the incoming order is an ask, i.e., an offer to sell, the identified order(s) will be a bid, i.e., an order to buy, at a price that is identical to or higher than the offer price.

Upon submission of an order, as described elsewhere herein, the order may be vetted against any applicable limit to determine whether or not the order will be accepted. Once accepted, regardless of whether the order was subject to a pre-acceptance credit check, the order is vetted against the appropriate order book database to determine whether one or more suitable but not yet fully satisfied counterorder(s) was/were previously received. If such a counter order is not identified, the incoming order is added to the order book database. If such a counter order is identified, a pre-execution credit check may be performed both for a self-imposed limit against the submitting trader and counter-party limit specified thereby for the one or more identified counter orders. Upon identification (matching) of a contra order(s), assuming any implemented credit checks have passed, a minimum of the quantities associated with the identified order and the incoming order is matched and that quantity of each of the identified and incoming orders become two halves of a matched trade that is sent, in a central counterparty based electronic trading system, to a clearinghouse. The Exchange Computer System considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto. As noted elsewhere, when using a clearing house, which generally performs risk mitigation via performance bonds, limits applied at order submission may be all that is required for protection, whereas with bilateral trading systems, limits may be needed at both order submission and execution, as well with regard to market data.

Traders access the markets on a trading platform using trading software that receives and displays at least a portion of the order book for a market, i.e., at least a portion of the currently resting orders. The trading software enables a trader to provide parameters for an order for the product traded in the market, and transmits the order to the Exchange Computer System. The trading software typically includes a graphical user interface to display at least a price and quantity of some of the entries in the order book associated with the market. The number of entries of the order book displayed is generally preconfigured by the trading software, limited by the Exchange Computer System, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

The disclosed systems and methods are compatible with any matching procedure or algorithm. Different products offered by a particular Exchange may use different matching algorithms. The manner in which orders are prioritized in the order book and/or allocated may thus vary. It will be appreciated that there may be other allocation algorithms, including combinations of algorithms, now available or later developed, which may be utilized in conjunction with the disclosed embodiments, and all such algorithms are contemplated herein.

Figure 3:
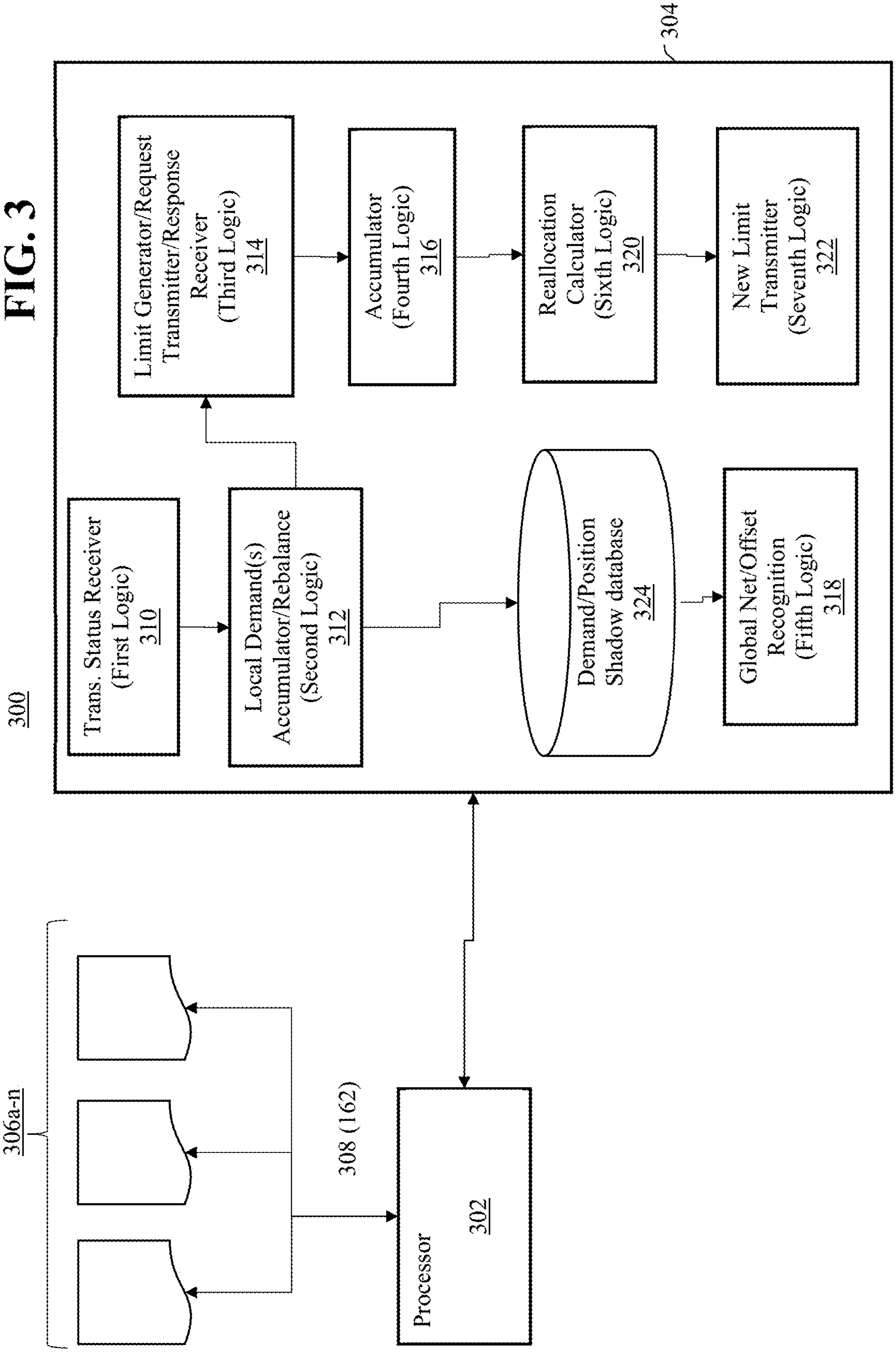
FIG. 3 is a block diagram of a system for centralized dynamic reallocation of credit limits according to one embodiment.

In one embodiment, the disclosed system, which may be the system 300 described below with respect to FIG. 3, is used for managing the trading of foreign currencies, such as spot FX, FX forwards, FX futures, etc., described above. More particularly, the disclosed embodiments may be implemented in conjunction with an electronic trading system which offers both central counterparty ODM-based and bilateral QDM-based trading at multiple logically and/or physically disparate execution venues. In this embodiment, participants may place orders to trade either bilateral or exchange traded instruments. Furthermore, as will be described, participants may define credit limits on one or more potential counterparties which the system will manage and enforce.

A given credit limit is a quantity specified by a limit grantor, such as in millions or billions of units of credit limit currency, with respect to a grantee and numerically represents the level of risk that the grantor will accept with respect to the actions of the grantee. The aggregate utilization of a limit should not exceed that limit.

In this embodiment, specific to positions held in currency instruments, credit limits, position risk, and corresponding credit consumed thereby, may be measured and accounted for in terms of the positions, i.e., currency balances, held by a trader in particular currencies that are created by trades or working/pending orders. For example, individual credit limits may be specified by a credit grantor for, and measured in USD, EUR, JPY, etc. Accordingly, for example, both a trade relating to EUR/USD and a trade related to USD/JPY may affect a traders position in USD, either increasing or decreasing such a position, as well their positions in EUR and JPY, and be evaluated, as described herein, against a specific USD credit limit. Credit limits may be specified in units of the credit limit currency, e.g., in millions, billions, etc., and numerically represent the level of risk that is acceptable to the grantor.

As described herein, these credit limits may be equitably and efficiently shared among the execution venues, e.g., via the system 300 and local credit control module 120 described in detail below, as well as among multiple trading system instances, such as between the bilateral (QDM) and counterparty based (ODM) trading systems offered at a particular execution venue, such that available credit is provided/apportioned to where it is needed, i.e., based on demand, without risk of overrun.

The local credit control function, referred to as an inline credit control (ICC), at each execution venue, which may be the local credit control module 120 described below, may provide local netting/offsetting, also referred to as intra-venue offsetting or compression, functionality which identifies/recognizes offsetting positions (completed trades as opposed to working orders) entered into by a particular trader at that venue when accounting for the amount of credit consumed by those positions, i.e., to reduce the amount consumed thereby in accordance with the amount of risk that is offset. Specifically with respect to positions in currency instruments, the ICC may recognize offsets in each currency involved in a given transactions. For example, a trader who sells a EUR/USD instrument, thereby increasing their position in USD, may see offset in their USD position, and corresponding USD credit limit utilization, from entering into a position selling USD/JPY which decreases their USD position.

As will be described, this embodiment further enables distributed position compression, also referred to as inter-venue offsetting or compression, to recognize offsetting positions held at different execution venues and/or traded via the bilateral (QDM) and counterparty based (ODM) trading systems, and inter-venue limit balancing as described herein.

The disclosed system may, for each trader and for each currency position, maintain five different accounting/balances: traded position, hypothetical long positions, hypothetical short positions, effective long positions, and effective short positions.

The traded position balance is a single signed value representing the sum of traded currency quantities, wherein a positive value is referred to as a long, implying the currency is owned, a zero value is referred to as a flat position, and a negative value is referred to as short, implying the currency is owed. For example, a buy EUR/USD trade creates a long EUR position and a short USD position. A subsequent sell trade of EUR/USD for the same quantity results in flat EUR and USD positions.

The hypothetical long and short positions balances reflect outstanding, working or pending orders, i.e., that have not been matched/traded, and in some implementations are indicative of reserved credit, as the order is not yet completed, rather than consumed. Hypothetical long positions are zero or positive whereas hypothetical short positions are zero or negative. For example a EUR/USD bid increases the hypothetical long position balance for EUR and decreases the hypothetical short position balance for USD. As was noted elsewhere, unlike traded positions, hypothetical positions do not offset each other as they do not yet represent actual risk.

The effective long and short positions balances are the separate sums of the traded and hypothetical position balances for long positions and short positions and summed separately to create a total utilization of the particular credit limit. Effective long positions are either zero or positive, whereas effective short positions are zero or negative. The effective long positions is the maximum of either zero or the sum of the traded positions and hypothetical long positions. It will be appreciated that this avoids a negative value when the traded positions are short and larger than the hypothetical long positions. The effective short position is the minimum of the zero or the sum of the traded positions and hypothetical short positions. It will be appreciated that this avoids a positive value when the traded positions are long and larger than the hypothetical short positions.

Utilization is a single positive number that is the sum of the effective long and short position balances and represents the total utilization of a particular credit limit. Summing the effective long and short position balances avoids a zero sum resulting from a simple aggregation of long and short balances and ensures that the measure of limit utilization does not exceed an assigned limit.

For a given currency pair and limit thereon, the available portion of that limit may be computed as separate available buy and sell limits. The available buy limit may be computed as $$buyAvailable = \max(0, availableLimit + \max(0, termTradedBalance + termHypotheticalSell) - \min(0, baseTradedBalance + baseHypotheticalBuy))$$

where AvailableLimit is the difference between the total utilization of a particular limit and that limit.

It will be appreciated that the quantity available to buy is increased by the non-offsetting long traded balance of the term currency where non-offsetting refers to the traded balance that is not offsetting an outstanding order balance. In a buy transaction, the term currency hypothetical sell decreases (larger negative magnitude). If the term traded balance is longer than the hypothetical sell is short, this increases the amount available to buy as given by the term:

max(0, term TradedBalance+termHypotheticalSell)

The quantity available to buy is also increased by a short base traded balance, as given by the term: min(0, base-Traded). Note that this term is always zero or negative, so it is subtracted from the available limit to reverse the sign.

The two increasing terms allow reversing of position (not merely trading out of position). These terms are the "order-utilization efficiency measures" that bend the rule that "utilization should never exceed the limit". The increasing terms work such that utilization may exceed limit while orders are active, but ensure that when orders are either filled or cancelled the utilization will be less than or equal to the limit.

The available sell limit for given currency pair may be computed as $$sellAvailable = \max(0, availableLimit + \max(0, baseTradedBalance + baseHypotheticalSell) - \min(0, termTradedBalance + termHypotheticalBuy))$$

For distributed position compression, the general process comprises three steps: borrow the positions from the execution venues, accumulate them at the central system to accomplish compression and global netting, and return the residuals back to the execution venues. While distributed position compression is in process, the borrowed positions are prevented from being locally netted or modified, e.g., canceled, which may undermine the offsetting process, without inhibiting the operations of the execution venue. Once the global offsets are recognized/computed, the residual positions are retuned back to execution venues in a fair manner and without danger of limit overrun. The disclosed system ensures that the execution venues can continue to transact during the operation The step of borrowing positions effectively requires each execution venue to communicate their traded balances, for each currency, to the central system. This may be thought of as a two pass process but can be performed as a single operation. First, the local ICC determines the per-currency traded balance quantity that can be borrowed without increasing utilization. Then, the local ICC determines the per-currency traded balance quantity that can be borrowed with limited increased utilization. The quantities from both passes are limited by a Global Balancing Factor (GBF), which is a value between 0 and 1 and described in more detail below. The borrowed quantities are reserved at the local ICC by adding the long borrowed quantities to the hypothetical long balance and adding the short borrowed quantities to the hypothetical short balance maintained thereby. Effectively, this treats these traded positions as working positions preventing them from being locally netted which may result in their associated risk being accounted for twice, once via local netting and a second time via the global compression process.

More particularly, during the first pass, traded balances that are not currently offsetting hypothetical or traded order balances are considered for rebalancing regardless of whether this will increase utilization (which is addressed below). Non-offset traded balances are multiplied by the GBF so that some residual traded balance is retained at the local ICC to support trading out of the position during the balancing operation. High GBF values favor global netting efficiency over local netting efficiency during balancing whereas low GBF values favor local netting efficiency during balancing over global netting efficiency. It will be appreciated that iterative or more frequent balancing operations may be needed if GBF is too low. The borrowed quantity is added to the hypothetical long or short balance depending on the sign of borrowed quantity (positive values added to hypothetical long, negative values added to hypothetical short).

During the second pass, traded balances offsetting active orders are considered for being borrowed, increasing overall utilization. The hypothetical short balance can be offset by the long traded balances, conversely the hypothetical long balance can be offset by the short traded balances reducing effective long/short magnitude and ultimately total utilization. The maximum increased utilization incurred due to balancing is calculated by multiplying available limit by the GBF Traded balances up to the increased utilization limit are borrowed in a pro rata, per-currency basis to avoid favoring one currency over another. The borrowed quantity is added to the hypothetical long or short balance depending on the sign of borrowed quantity (positive values added to hypothetical long, negative values added to hypothetical short).

The step of accumulating the borrowed balances includes each ICC at each execution venue communicating, e.g., via a data message transmitted via the data network coupled therebetween, the borrowed balances to the central system, e.g., iPalm, where they are accumulated on a per-currency basis. The central system sums the borrowed traded currency balances provided by the ICCs as they arrive. For example, an ICC with a long EUR balance reverses the position of an ICC with a short EUR balance.

In the disclosed embodiments, credit utilization against a limit is a represented as a single number. For net limits on FX, per-currency utilization is tracked to properly handle the ability to "trade out" of a position. The industry practice for implementation of net FX limits is to track positions by currency and model transactions as a two-way asset exchange. For example, if one buys EUR/USD then they are buying EUR and selling an equivalent quantity of USD. The buy is tracked as a positive value and the sell as a negative. To produce the single utilization number in this case, an obvious but incorrect method would be to add the current positions together. The EUR and USD positions in the example would be additive inverse quantities and thereby the sum would be zero—this is the zero sum problem. To overcome this, the disclosed embodiments employ aggregation methods. There are three methods commonly used in FX: longs-only, shorts-only, and greater of longs and shorts. Longs-only adds positive positions to provide overall utilization. Shorts-only adds negative positions to provide overall utilization. Greater adds both longs and shorts separately and takes either the longs sum or the absolute value of the shorts-only whichever is larger.

The disclosed embodiments use the greater method. This is because the compression of positions across transaction processors (ICCs) breaks the zero-sum behavior described above. For example, if venue 1 has EUR and JPY positions of 10 and −10 respectively; venue 2 has EUR and USD positions of 5 and −5; venue 2 has CHF and JPY positions of −15 and 15. Each venue has a zero-sum when positions are added, but there is an inefficiency across venues with respect to JPY. Globally JPY is flat v1 has −10, v2 has −5, v3 has +15 making JPY globally flat. After compression, one would have one-sided positions in all three venues. As more compression operations are performed, symmetry between long and short currencies become more divergent. Accordingly, the risk of using long-only or short-only aggregation is that the result is a limit overrun (using longs-only when long positions are eliminated by compression but a substantial short aggregate position exists). Using the greater method closes this gap.

In the final step, once all of the ICC's, e.g., local credit control modules 120, have responded, e.g., after a time out of 30 seconds or some other implementation defined wait time, the computed residuals are sent back to the ICC's, e.g., via an electronic "balancing complete" message transmitted via the communications network to each ICC and containing that ICC's respective residual balance. In particular, on a per-currency basis, the quantity returned never exceeds that which was borrowed to avoid a potential limit overrun and the quantity direction is also respected, e.g., if a long quantity is borrowed, then a short quantity will not be returned as this could also result in a limit overrun. The residual quantities are returned to the ICCs from which they were borrowed on a pro rata basis—i.e. proportionally to each ICC based on quantity borrowed. For example, consider the case where EUR/USD is bought on ICC1 and USD/RUB is bought on ICC2. In this scenario, global compression will cancel the USD position leaving EUR and RUB positions. Accordingly, the EUR would be returned to ICC1 and RUB would be returned to ICC2. Upon receipt of the residual balance, the ICC unreserves the full borrowed quantity by subtracting the quantity from the hypothetical long and short balances respectively, and adding per-currency residual value back to the traded balance.

In this embodiment, credit limit rebalancing is implemented, generally, so as to track simple limit demand, rather than actual utilization, and uses this to apportion limits to the execution venues. For example, the system tracks short term and long term demand, as described below, using notional, gross and/or net, transaction quantity by currency pair, e.g., a sum of all transactions performed. As opposed to tracking actual utilization of credit at each execution venue, using demand enables the disclosed system to anticipate need and avoid latency between assessing actual utilization, which can change quickly, and actually adjusting a given limit during which actual utilization may have changed, rendering the adjustment irrelevant or inapplicable. Advantageously, the disclosed system allows the execution venues to continue operating during the rebalancing process and avoids attempting to alter limits based on out of date data, i.e., inaccurate utilization. Demand in excess of the current limit is included (failed credit utilization due to limit restrictions), as this should impact limit sharing. An "equilibrium" factor, which may be set, for example, by an administrator, is considered so that some proportion of a given limit may be allocated to ICCs without current demand, or little to no demand history, to ensure some credit is allocated to accommodate changing demand patterns and for newly created limits that have no demand history.

The disclosed system implements a demand-based feedback loop and acts to raise or lower limits, without exceeding a total limit, based on historical demand for credit assessed at each execution venue, where each rebalance cycle operates on then current demand data. As such, it may be considered that the central system "owns" the credit limits whereas each execution venue "owns" the utilization, i.e., the data indicative thereof.

More particularly, a limit weighting function is applied whereby each execution venue/ICC is assigned a computed weight value which controls the apportionment of a given credit limit thereto. For each execution venue/ICC, the weighting calculation consists of two demand terms/components, short term and long term, reflecting relative limit demand across ICCs, and a single equilibrium term/component.

The short term demand component reflects limit demand over a short term demand horizon wherein demand accounted for under this term ages or decays quickly, e.g., over 30, 60 or 120 minute time window or other value. This component reflects demand for credit over the defined time interval. In one embodiment, demand is depreciated by multiplying the total demand by a configured factor of less than 1 on a configured schedule. For example to achieve a 2 hour decay window, demand can be multiplied by 0.7 every 20 minutes which will achieve a 90% reduction over 2 hours. This may be less computationally intensive than maintaining specific transaction values over time and then subtracting or discounting them specifically.

The long term demand component reflects limit demand over a longer term demand horizon, such as multiple days or weeks, e.g., 14 days, and reflects the demand for credit over the longer interval.

The equilibrium component is a simple term reflecting the number of ICCs sharing, equality for all, and is useful, such as at start up before the described feedback loop cycles around, for new limits with no demand history and to accommodate changes in grantor, grantee group membership, and changing trading patterns, e.g., a given trader moving from one execution venue to another.

For each ICC, its weighting value (Wicc) is calculated as:

$$Wicc = Cltd * LTDratio\ \ Cstd * STDratio + Ceq * EQratio$$

Cltd, Cstd, Ceq are configurable coefficients which allow tuning of the relative impact of the terms on the result.

LTDratio is calculated as that ICC's long term demand divided by the total long term demand for all of the ICC's. STDration is similarly computed for the short term demand component. For the equilibrium component, EQratio is calculated as 1/<no. of ICC's>. Each ratio is a value between 0 and 1, the sum across all ICC's being 1. Ratios are used is to isolate the impact of the terms on the result, i.e., to prevent the magnitude of a term from have undue influence on the result.

The balancing function multiplies the total credit limit value by an ICC specific weighting value, Wratio, resulting in the target limit for that ICC, Licc.

$$Wratio = Wicc/\text{Sum of all } Wicc\text{'s}$$

$$Licc = \text{LIMIT} * Wratio$$

Wratio is a per-ICC weighting, which is the individual weighting value Wicc for an ICC divided by the sum of the Wicc values for all ICCs. Again this yields a value between zero and 1 and the sum of the Wratios for all ICCs is always equal to one.

With the target limits Licc computed for each ICC, the ICC's and the central system/iPalm coordinate the limit balancing. Based on the computed target limits, ICCs may be grouped into three types, those that will receive a reduction, those that will receive an increase and those that will be left unchanged.

For ICCs that will have a limit reduction, the resulting limit being less than the currently allocated limit, the central system sends the new limit value to the ICC essentially asking/requesting for some limit to be reclaimed, where the ICC then responds with lesser of the difference between the new limit and current limit or the available limit, and any reclaimed limit is accumulated at the central system. This enables the ICC to determine whether it can actually move to the new limit, e.g., it may have received an intervening transaction and no longer has the same availability, or it may choose to reserve some credit, etc. Accordingly, an ICC may respond with less than what was requested. As opposed to relying on knowledge of the actual utilization which may be outdated due to latency, the disclosed embodiment's use of demand and requests to the ICC's, enables the ICC's continue operating during the rebalancing process and enables the ICC's to make determinations as to available credit based on real time utilization known to them without having to communicate that data to the central system.

In one embodiment, a two-step process may implemented for handling lost or delayed response from an ICC to the central system, e.g., IPalm. IPalm will wait a configurable amount of time (such as 30 seconds in one configuration). If the response is not provided/received within this time, IPalm places the ICC in an isolated state. In this state, IPalm will exclude the ICC from further request/response interactions (balancing and compression operations) until all outstanding responses are received at which point IPalm will return the ICC to normal, active status. If the ICC is irrevocably partitioned due to message loss or hardware failure, then the ICC is placed into an ejected state. The only way for the ICC to return to active status is for the ICC to be re-initialized. This ensures that IPalm and the ICC are in-sync from a data perspective.

Once all ICC's subject to a limit reduction have responded, the accumulated reclaimed credit, which may be less than was asked for, is then reallocated to those ICC's that are to receive a limit increase. For ICCs that will have a limit increase, where the resulting limit is greater than the currently allocated limit, the central system calculates the actual limit increases to each increasing ICC based on the corresponding Wicc weighting computed above as applied to the accumulated reclaimed amounts and sends a data message including the calculated limit increase to each of the affected ICCs.

For ICCs where the calculated limit is the same as the existing limit, no further action need be taken.

In another embodiment, the disclosed credit control system may be further used to facilitate market data filtering. In particular, as was noted above, traders may establish credit relationships, i.e., set credit limits, with other traders to enable trading therebetween. Where a trader does not wish to trade with another party they may not specify a limit or may specify a limit of zero, etc. Accordingly, each trader may be limited as to which other traders they may trade with.

As was noted elsewhere, as transactions are received, the electronic trading system may generate market data messages which are sent to the market participants and which contain data indicative of the result of those transactions, e.g., what effect they may have had on an order book database based on whether the trade order was wholly or partially successful or not. For incoming trade orders which are not completely satisfied by a previously received counter order, the market data message may serve to advertise the opportunity created thereby in order to solicit a suitable counter order from another trader. For incoming trade orders which partially or completely satisfy a previously received but unsatisfied order, the opportunity created thereby having been previously communicated, the market data message may serve as a notification of the extent to which that prior order has been satisfied. In a bilateral QDM market, the market data messages may include requests for quotes, indicative quotes and/or binding quotes provided by market participants.

As a given trader may not be able to enter into trades with all other traders, or may be limited as to particular instruments they are allowed to trade, etc., it may be useful to limit the information available to that trader, e.g., so that they are only able to access information regarding quotes, trades and/or counter parties that they allowed to transact with. With respect to credit limits, this may be referred to as credit filtering. Credit filtering may be performed for the convenience of the trader so as to limit the amount of irrelevant information that they must process, minimize the entry of improper orders, etc. Credit filtering may also be implemented so as to preserve confidentiality of information, e.g., such that information regarding the various credit relationships between parties may only be known by those parties.

Credit filtering is typically realized on the electronic trading interface of the trader's client device where the result of filtering is presented to the trader. Such filtering may be simply implemented to display only data, e.g., quotes, market updates, etc., related to traders and/or products with which the trader is allowed to interact. Alternatively, the interface may display only data related to traders and/or products where the trader still has remaining credit, thereby hiding data relating to transactions that would not be accepted due to lack of credit. Still, in another embodiment, the interface may display information relating to remaining credit, at one or more of the local execution venues and/or globally across the entire trading system, e.g., market data may be displayed with indicators, such as color codes, which indicate when available credit is below one or more threshold levels. Such an interface may further display indicators when credit availability at a particular execution venue is low or exhausted but credit is still available globally. Such an embodiment may further include a mechanism for the trader to initiate a manual request for rebalancing of credit allocations as described herein. In yet another embodiment, the trader's interface may dynamically respond to the entry of a new order/order ticket and indicate when insufficient credit is available for the order as entered. The interface may then further suggest modifications to the order such that it would be acceptable given the current available credit. In yet another embodiment, the trader's interface may further display current working/pending and/or executed trade orders and their effect on the utilization of a particular limit. Such data may be displayed for one or more, or all, execution venues, and may further include indications of local and/or global offsetting opportunities as well as the potential results thereof. Such an interface may enable a trader to appreciate where, if needed, additional credit availability may be recovered.

Credit filtering may be implemented, generally, by filtering the market data messages before they are transmitted to the traders and/or by providing the unfiltered market data along with the filtering criteria to the traders such that their trading interface may implement the filtering. Filtering the outgoing market data messages may increase the computational burden on the electronic trading system but reduce the amount of data transmitted to the market participants and also prevent a given participant from receiving market data messages that should not have access to. Filtering at the trading interface may reduce the computational burden on the electronic trading system. More information regarding mechanisms for implementing credit filtering which may be implemented in conjunction with the disclosed demand based limit rebalancing may be found in U.S. patent application Ser. No. 17/154,265, as well as U.S. Pat. Nos. 5,375,055 and 10,692,143, both of which are herein incorporated by reference.

In either case, the filtering criteria, e.g., the current credit limits and/or available portions thereof, needs to be communicated from the credit control system, e.g., the credit control module 120, which may be referred to as the "leader component," to the filtering mechanism, e.g., the market data module 112, market data gateway, or to the trader client devices, which may be referred to as the "follower component," in a timely manner. As was noted above, credit utilization may be constantly changing as transactions are received and processed by the electronic trading system. Accordingly, as displayed to a trader on their trading system interface, the displayed credit information, or filtered result thereof, may not reflect the actual current utilization, e.g., the trader's display may show available credit when, in fact, a recent transaction, has consumed that available credit. In one embodiment, the disclosed system may tag the filter criteria or any market data filtered based thereon with timing data indicating a time when the filter criteria was determined or otherwise indicate the latency or aging thereof relative to the information displayed on the trader's trading interface and/or a current time.

In one embodiment, the disclosed system minimizes the latency between the actual updates to credit utilization and the application of that data to filtering outgoing market data messages, or transmission of the filtering criteria to market participants, by locating the market data module 112, logically and/or physically close to the credit control module 120.

FIG. 1 depicts an example of an execution venue 100, which may be used with the disclosed embodiments, e.g., as one of the execution venues 306*a-n* described below with respect to FIG. 3. The execution venue 100 may include a trading network environment for implementing trading systems and methods with credit control in accordance with one example. It will be appreciated that an execution venue 100 may include both the trading network environment and one or more exchange computer systems 101 or include just the one or more exchange computer systems 101 and ancillary components which are coupled with the trading network environment. In this case, an exchange computer system 101 receives orders and transmits market data related to orders and trades to users, such as via wide area network 162 and/or local area network 160 and computer devices 150-156, 166, as will be described below, coupled with the exchange computer system 101. The depicted execution venue 100 may be an example of an ODM. Other execution venues may implement a QDM or both an ODM or ODM, or hybrid thereof or alternative thereto. As was described above, the depicted execution venue 100 may be located geographically and/or logically in a particular location, such as a location that is geographically and/or logically proximate to the computer device 150-156, 166 which, as described, may be used to submit electronic trade orders to the execution venue 100. It will be appreciated that computer device 150-156, 166 may also be coupled with other execution venues, such as via the networks 160, 162 so as to be able to submit electronic trade orders thereto as well.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herein unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 101 may be implemented with one or more mainframe, desktop or other computers, such as the computer 200 described below with respect to FIG. 2. A user database 102 may be provided which includes information identifying traders and other users of exchange computer system 100, such as account numbers or identifiers, user names and passwords. An account data module 104 may be provided, which may process account information that may be used during trades and/or credit control, as described below. One or more match engines or match engine modules 106 may be included to match bid and offer prices and may be implemented with software that executes algorithms for matching bids and offers, in conjunction with controlling credit, as will be described in more detail below in connection with FIGS. 3 and 4. Each match engine module 106 may handle transactions for different product or group of products traded on the Exchange. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 114 may be included to compute and determine a user's risk utilization in relation to the user's defined risk thresholds. In some cases, the risk management module 114 may be used to implement the credit control processing described herein, as will be addressed in connection with the example of FIG. 3. An order processing module 118 may be included to decompose delta based and bulk order types for processing by the order book module 110 and/or match engine module(s) 106. A volume control module may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module(s) 106, the trade database 108, the order book module 110, the market data module 112, the risk management module 114, the order processing module 118, or other component of the exchange computer system 101. Any number of the above-described trading system components may be used or otherwise involved in implementation of the credit control of the disclosed methods and systems.

The trading network environment of the execution venue 100 or in which the execution venue 100 is implemented is shown in FIG. 1 and includes example computer devices 150-156, 166 which depict different example methods or media by which a computer device may be coupled with the exchange computer system 101 or by which a user/trader may communicate, e.g. send and receive, trade or other information therewith. It will be appreciated that the types of computer devices deployed by traders and the methods and media by which they communicate with the exchange computer system 101 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 101. Depending on the type of computer device, a user can interact with the computer with a keyboard, pointing device, microphone, pen device or other input device now available or later developed.

An example computer device 150 is shown directly connected to exchange computer system 101, such as via a T1 line, a common local area network (LAN) or other wired and/or wireless medium for connecting computer devices, such as the network 220 shown in FIG. 2 and described below with respect thereto. The example computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the example computer device 150 or a user thereof. The user of the example computer device 150, or the example computer device 150 alone and/or autonomously, may then transmit the trade or other information to the exchange computer system 101.

Example computer devices 152 and 154 are coupled with the local area network ("LAN") 160, which may be configured in one or more of the well-known LAN topologies, e.g. star, daisy chain, etc., and may use a variety of different protocols, such as Ethernet, TCP/IP, etc. The example computer devices 152 and 154 may communicate with each other and with other computer and other devices, which are coupled with the LAN 160. Computer and other devices may be coupled with the LAN 160 via twisted pair wires, coaxial cable, fiber optics or other wired or wireless media. As shown in FIG. 1, an example wireless personal digital assistant device ("PDA") 158, such as a mobile telephone, tablet based computer device, or other wireless device, may communicate with the LAN 160 and/or the Internet 162 via radio waves, such as via Wifi, Bluetooth and/or a cellular telephone based data communications protocol. The PDA 158 may also communicate with exchange computer system 101 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Example computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described below with respect thereto.

As was described above, the users of the exchange computer system 101 may include one or more market makers that may maintain a market by providing constant bid and offer prices for a derivative, security, or other financial product to the exchange computer system 101, such as via one of the example computer devices depicted. The exchange computer system 101 may also exchange information with other trade engines, such as trade engine 170.

In the example of FIG. 1, the execution venue 100 may be coupled with other execution venues (not shown) which may support trading activities in venues geographically remote from the exchange computer system 100, e.g., located in Tokyo and London, and coupled therewith via the Internet 162 and/or other non-proprietary or proprietary distributed network. One or more components of the exchange computer system 101 may be replicated in the other execution venues.

The trading environment of the execution venue 100 may include any number of additional match engines and other computers and systems coupled to the exchange computer system 101. Such computers and systems may include clearing, regulatory and fee systems.

The operations of computer devices and systems shown in FIG. 1 may be controlled by computer-executable instructions stored on a computer-readable storage medium (as opposed to computer-readable communication media involving propagating signals) or a non-transitory computer-readable storage medium. For example, the example one or more of the computer devices 150-156, 166 may include computer-executable instructions for receiving order information from a user and transmitting that order information to exchange computer system 101. In another example, the example one or more of the computer devices 150-156, 166 may include computer-executable instructions for receiving market data from exchange computer system 101 and displaying that information to a user.

Of course, numerous additional servers, computers, handheld devices, personal digital assistants, telephones and other devices may also be connected to exchange computer system 101. Moreover, one skilled in the art will appreciate that the topology shown in FIG. 1 is merely an example and that the components shown in FIG. 1 may include other components not shown and be connected by numerous alternative topologies.

The ability to see all incoming transactions and match events for a given set of markets allows for improved market protection mechanisms, such as improved credit controls based on pre and post-trade transactions, e.g. incoming orders and executed trades, referred to as "in band." Credit controls generally evaluate trader activity, e.g. trade orders and executed trades, against specified activity limits, e.g. credit/risk limits. Credit controls may be applied to individual traders and/or organizations of traders, such as all of the traders working for a particular broker. Controlling use of a credit limit is thus provided by the disclosed systems and methods regardless of the number of market participants having access to the credit limit.

Applying credit controls have typically involved determining, for example, the risk incurred with each transaction undertaken by the market participant. That risk determination generally involves making one or more assumptions as to future events and applying those assumptions to the current transaction.

The disclosed systems and methods control the use of a credit allocation/limit proactively and implemented in connection with, and may account for both incoming orders and completed trades in regulating order acceptance and execution. Such proactive credit control eliminates the need, for example, to retroactively "unwind" completed transactions which exceeded a trader's credit limit. Instead, a given order that results in improper use of a credit limit (as described below) may be blocked or otherwise not accepted before a trade is executed. Such orders may be prevented from entry into an order book. The manner in which use of the credit limit is limited may vary. For instance, the order may be redirected or otherwise processed, e.g., for consideration by a creditor of an increase in the credit limit or a suspension of the credit control. Depending upon the implementation, only once an order is accepted or traded, is it then accounted for against the available limit, e.g., to reduce the available amount.

In the example of FIG. 1, credit monitoring may be provided by the risk management module 114 and/or a local credit control module 120, also referred to as an inline credit controller 120. For example, the risk management module 114 may be configured to coordinate activities across and otherwise direct the credit controller 120. Alternative or additional processors, such as other components of the exchange computer system 101, may be used to provide the coordination, direction, and other management functions in other cases. The risk management module 114 may thus be considered one example of a management processor for credit control. In the example of FIG. 1, the credit controller 120 may be disposed within or coupled with the match engine(s) 106. For instance, the credit controller 120 may be disposed in-line with the match engine(s) 106 such that all incoming orders directed to the match engine are investigated or otherwise processed by the credit controller 120 for possible credit violations. The credit controller 120 is allocated a portion of the credit limit by as will be described below. Where more than one credit controller 120 is provided, e.g., one for each match engine 106, each may be allocated a portion of the risk limit as described herein. Within a given execution venue 100, the allocation of a portion of limit among multiple credit controllers 120 may be managed by the risk management module 114. The risk management module 114 and/or other processor is configured to maintain a total view of a portfolio of a market participant, and reallocate the credit limit accordingly within the execution venue 100. The allocation of a portion of a limit to each execution venue 100 will be discussed in more detail below.

As described herein, credit control is provided via distributed components, the set of credit controllers 120, each located at an execution venue 100, and a centralized or non-distributed component, the management or allocation system 300 described in more detail below with respect FIG. 3. The combination of distributed and non-distributed elements of the credit control system constitutes a technical solution to the technical problems discussed herein. For instance, the in-line credit control provided via the credit controllers 120 avoids the slippage that is possible with out-of-band credit control. The processing demands associated with reversing trades are therefore also avoided. The architecture or arrangement of the trading environment may differ from the example of FIG. 1 and still provide decentralized or distributed credit control in accordance with the disclosed systems and methods. For instance, any number of match engine-credit controller pairs may be used.

Credit may be allocated to the credit controllers 120 by the system 300 on any basis as described herein. The system 300 and/or other management processor maintains credit in totality, and periodically reapportions the credit in accordance with one or more parameters. For instance, one factor may be indicative of the relative extent to which a market participant has traded in a respective product group. For example, a market participant with a credit limit of $100M has historically traded around 25% in metals, 25% in equities, and 50% in energies. The management processor accordingly allocates $25 m, $25 m and $50 m to the respective credit controllers 120 associated with execution venues 100 handling incoming orders for those product groups. If one execution venue 100 is handling more than one of the product groups, the corresponding credit controller 120 for that venue may apply the respective limits to each product group separately. Such pre-allocation of credit by the system 300 allows the disclosed systems and methods to maintain the flexibility of a single credit limit, while also preventing credit overruns. Further details regarding the allocation procedure are provided in connection with the examples of FIGS. 3 and 4.

While the credit controllers 120 are handling incoming orders, the system 300 monitors all of the trading activity in all of the active markets, i.e., across all of the various execution venues 306*a-n* (100) as will be described, to determine whether the allocations should be adjusted. For instance, if the system 300 determines that the market participant is using credit in one product group, e.g., equities, faster than normal, the management processor may reduce the credit allocated to one or more of the other product groups (e.g., energies and metals), and then allocate extra credit to equities. The market participant is thereby allowed to trade more than normal in that product group. The extent to which the system 300 adjusts the allocations may depend on a number of factors or parameters, including, for instance, various historical trends of the market participant's trading activity and/or the market.

The system 300 may implement a predictive routine that takes the various factors and parameters as inputs. In some cases, the predictive routine may be or include a machine learning procedure. Alternative or additional procedures may be implemented, including, for instance, a Bayesian Probability routine. To support the implementation of the procedure, the management processor may perform one or more of the following functions:

(i) Monitor all order executions from all active execution venues 306*a-n* (100), markets;
(ii) Compile all order executions into a set of held positions for each market participant;
(iii) Sum the sets of positions across the product groups to compute a total portfolio;
(iv) Maintain the traded positions currently held by the market participants;
(v) Maintain historical trends of portfolio utilization for market participants over time (e.g., last few weeks to months);
(vi) Maintain an aggregate trend for a "generic" trader for when a new market participant is added to the system; and,
(vii) Maintain some measure of book depth, price movement, and/or volatility for each product group market, e.g., at each venue.

Using any combination of these or other factors and parameters, the system 300 may periodically assess credit utilization of an individual market participant against her historical trend, and/or assess the current change in market dynamics, to adjust credit. In this way, the credit allocations may be adjusted preemptively (i.e., before the credit is needed) and transactionally (i.e., the credit is deducted from one product group's allocation before being added at another group's allocation).

Figure 2:
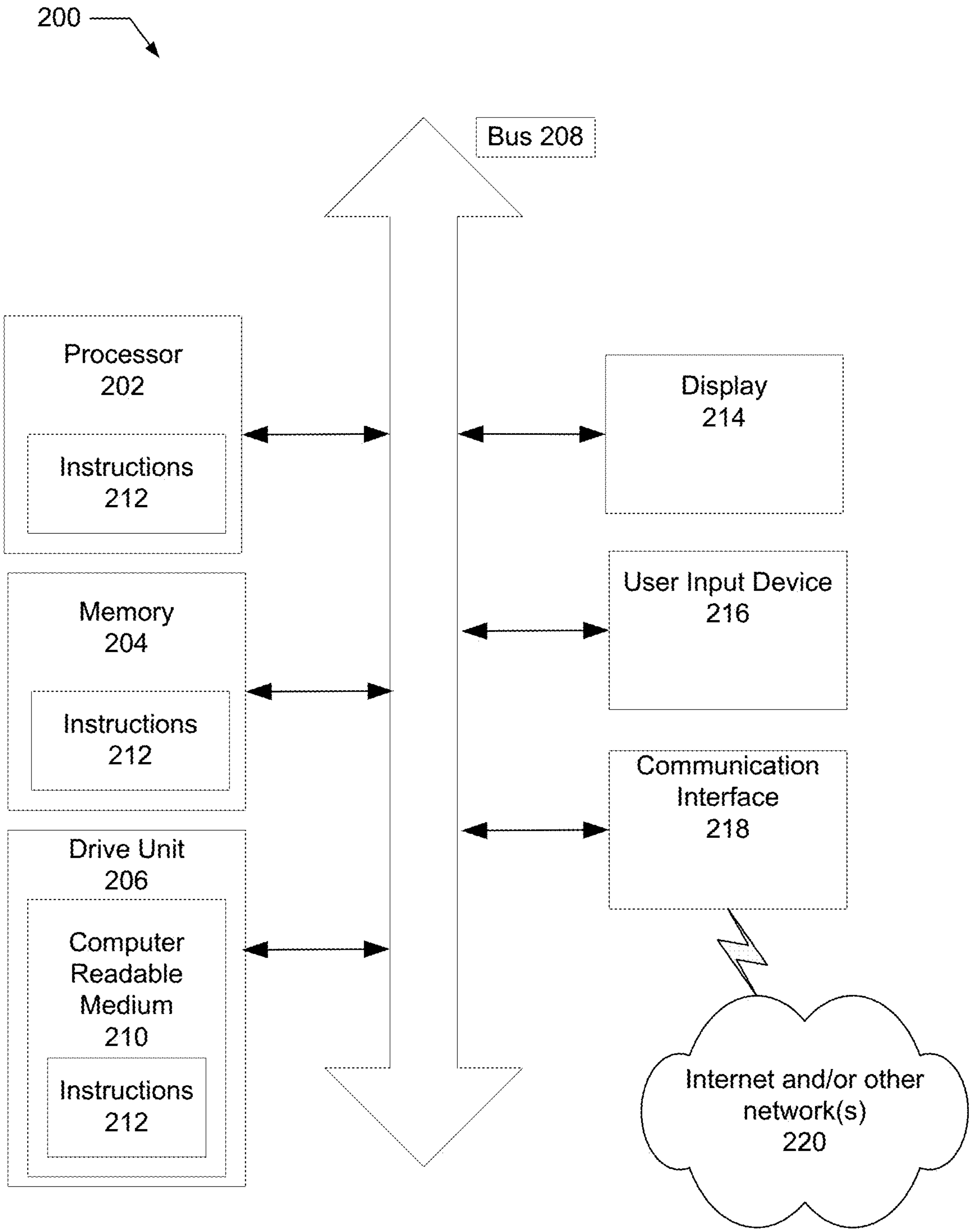
FIG. 2 shows an illustrative embodiment of a general computer system for use in or with the examples of FIGS. 1, 3 and 4.

Referring to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above may be a computer system 200 or a component in the computer system 200. The computer system 200 may implement a match engine on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate with a drive unit 206 and other components of the system 200 via a bus 208. The memory 204 may be a main memory, a static memory, or a dynamic memory. The memory 204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data.

The memory 204 is operable to store instructions 210 executable by the processor 202. The functions, acts or tasks illustrated in the figures or described herein may be performed by the programmed processor 202 executing the instructions 210 stored in the memory 204. The instructions 210 may be loaded or accessed from a computer-readable storage medium 212 in the drive unit 206 or other data storage device. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 200 may further include a display unit 212, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include an optical or other disk drive unit as the drive unit 206. The disk drive unit 206 may include the computer-readable storage medium 212 in which one or more sets of instructions 210, e.g. software, can be embedded. Further, the instructions 210 may embody one or more of the methods or logic as described herein. In a particular embodiment, the instructions 210 may reside completely, or at least partially, within the memory 204 and/or within the processor 202 during execution by the computer system 200. The memory 204 and the processor 202 also may include computer-readable storage media as discussed above.

The present disclosure contemplates a computer-readable medium that includes instructions 210 or receives and executes instructions 210 responsive to a propagated signal, which may be received via a communication interface 218. The system 200 may be connected to a network 220 to communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to TCP/IP based networking protocols.

FIG. 3 depicts a block diagram a system/apparatus 300 for regulation of distributed processing of a plurality of transactions, each characterized by an associated transactional value, which may represent a demand for credit, by multiple transaction processors, i.e., execution venues 306*a-n* each of which may comprise an execution venue 100 and electronic trading system 101 as described above, in accordance with a dynamically reallocated global limit defining a total associated transactional value of processed transactions, e.g., a global credit limit. More particularly, the system/apparatus 300 implements a credit limit allocation mechanism which manages allocation of a total credit limit to a plurality of geographically and/or logically distributed transaction processors.

It will be appreciated that the system/apparatus 300 may be implemented by/at one of the plurality of execution venues 100 or separate therefrom. For example, the system 300 may be implemented as a module or component thereof of the exchange computer system 101 of one of the execution venues/transaction processors 306*a-n* (100). The system 300 includes a processor 302, and a non-transitory memory 304 coupled therewith, such as the processor 202, memory 204, described in detail above with reference to FIG. 2.

The system 300 may include, i.e., the processor 302, which may be referred to as an allocation processor 302, may be coupled with, a transaction status receiver 310 which is operative to receive, from any of a distributed plurality of transaction processors 306*a-n* via a communications network 308 coupled therewith and the processor, which may be the network 220 described with respect to FIG. 2 or the network 160, 162 described with respect to FIG. 1, data indicative of either a rejection or at least acceptance and an associated transactional value of a transaction processed thereby, the at least acceptance of a transaction by a particular one of the plurality of transaction processors 306*a-n* causing an amount of a portion of a total limit previously allocated thereto to be consumed in accordance with the transactional value associated with the at least accepted transaction, a transaction being rejected by a transaction processor 306*a-n* when, as compared at least with the transactional value associated with the rejected transaction, an insufficient amount remains of the portion of the total limit previously allocated thereto.

Each of the transaction processors 306*a-n* may be an execution venue 100 or electronic trading system 101 thereof, or at least a component thereof, or implemented separate therefrom. A transaction may comprise an order to trade received from one of a plurality of market participants (not shown) connected to the transaction processor 306*a-n* via the network 220, i.e., to buy or sell, a quantity of an tradeable product, such as a financial instrument, currency, etc. Each transaction processor 306*a-n* may implement an inline credit control system, as described herein, which applies an allocated portion of a credit limit to approve or reject transactions received thereby where the acceptance of a transaction by a particular one of the plurality of transaction processors 306*a-n* causing an amount of a portion of a total limit previously allocated thereto to be consumed, a transaction being rejected by a transaction processor 306*a-n* when an insufficient amount remains of the portion of the total limit previously allocated thereto. As described herein, depending upon the type of electronic trading system, acceptance of a transaction, and corresponding consumption of credit, may occur upon receipt by the transaction processor 306*a-n* or when the transaction is actually executed. In one embodiment, an acceptance is only transmitted (and the credit amount accounted for) when a transaction is executed creating a nettable position. Rejection of a transaction may mean that the remaining allocated portion of the limit is insufficient to cover the transaction, but not necessarily exhausted, or the allocation has been exhausted, either of which may be indicated in the communicated data.

The data communicated from the transaction processor 306*a-n* to the transaction status receiver 310 may be an electronic data messages such as one or more data packets, which may be communicated in real time with respect to the processing of the associated transaction, and may include additional data indicative of the transaction which was approved or rejected, such as the parameters thereof, e.g., side (buy/sell), quantity, product, etc. In one embodiment, for accepted transactions, the data is sufficient to allow the system 300 to recognize offsetting positions/transactions accepted at different transaction processors 306*a-n* as well as the degree to which each of those positions offsets the other, i.e., in terms of risk, with respect to the credit limit. In one embodiment, a transaction processor 306*a-n* may send data indicative of a “demand transaction” which may not be the result of the processing of an incoming transaction but is intended to trigger the described reallocation process in order to have additional credit allocated to that transaction processor 306*a-n*, such as in anticipation of a need therefore.

It will be appreciated that initially, e.g., at startup or the start of a trading session, etc., the total credit limit may be allocated to the plurality of transaction processors 306*a-n* equally, based on historical consumption, or based on some other allocation algorithm.

The system 300 further includes local demand accumulator/rebalance logic 312 coupled with the transaction status receiver 310 which is operative to accumulate the associated transactional values of the at least accepted transactions, separately in association with each transaction processor 306*a-n* from which data indicative thereof was received, in a database, such as the demand/position shadow database 324, coupled with the processor.

The local demand accumulator/rebalance logic 312 is further operative to determine, such as based on the received data and/or based on data maintained in the memory 304 as will be described or otherwise performed periodically such as upon expiration/elapse of a time interval, that at least one of the plurality of transaction processors 306*a-n* has rejected a transaction or, based solely on the accumulated transactional values in the database, at least one of the plurality of transaction processors 306*a-n* has an associated accumulated transactional value equal to, or within a threshold, e.g., 90%, of, the portion of the total limit previously allocated thereto, and a computed difference between the total limit and a total of the accumulated transactional values associated with all of the transaction processors 306*a-n* in the database exceeds a defined threshold amount, e.g., 10% of the total limit, i.e., there exists sufficient remaining credit across all of the transaction processors 306*a-n* such that rebalancing will not simply deplete the credit allocation of another transaction processor 306*a-n* causing, for example, thrashing. As was noted above, the accumulation of the transactional values may be an indicator of demand for credit at a given transaction processor 306*a-n* and may differ from the current actual utilization of the allocated credit limit due to the latency in receiving updates from that transaction processor as well as due to any intra-transaction processor/local offsetting/netting of transaction provided thereby which may lower the credit utilization. In an alternative embodiment, the local demand accumulator/rebalance logic 312 may further determine if a rate of consumption of a limit or a change in rate of consumption of a limit exceeds a defined threshold value. If none of these conditions are met, the system 300 may determine that rebalancing, and the necessary processing and communication of messages, is not worthwhile. For example, if the total of the remainders of the portions of the total limit previously allocated to the plurality of transaction processors do not exceed a defined threshold amount, there may be an insufficient amount available to reallocate to one transaction processor 306*a-n* without leaving another with an insufficient amount to continue to process transactions which may result in thrashing where the system 300 continually attempts to move an insufficient supply to one transaction processor 306*a-n* and depriving another.

Based on the determination that at least one of the plurality of transaction processors 306*a-n* has rejected a transaction or, based solely on the accumulated transactional values in the database, at least one of the plurality of transaction processors 306*a-n* has an associated accumulated transactional value equal to, or within a threshold of, the portion of the total limit previously allocated thereto, and a computed difference between the total limit and a total of the accumulated transactional values associated with all of the transaction processors 306*a-n* in the database exceeds a defined threshold amount, a limit generator 314, coupled with the local demand accumulator/rebalance logic 312, computes, based on the accumulated transactional values, i.e., accumulated demand, associated with all of the transaction processors 306*a-n* stored in the database and the computed difference, for each of the plurality of transaction processors 306*a-n*, a proposed portion of the total limit to be allocated thereto which is greater than, equal to, or less than the portion of the total limit previously allocated thereto.

The limit generator 314 then transmits, via the communications network 308, a request message to each of the plurality of transaction processors 306*a-n* for which the proposed portion of the total limit to be allocated thereto is less than the portion of the total limit previously allocated thereto, i.e., each transaction processor 306*a-n* whose allocation is being reduced, the request message comprising a request that each of those transaction processors 306*a-n* reduce the portion of the total limit previously allocated thereto to the proposed portion of the total limit to be allocated thereto and respond with a data message comprising data indicative of an amount by which the transaction processor 306*a-n* has reduced the portion of the total limit previously allocated thereto responsive to the requested reduction. As noted elsewhere, as the actual utilization at any transaction processor 306*a-n* may be different from the accumulated transactional values upon which the proposed limits are based, a particular transaction processor 306*a-n* may not have sufficient available credit to make the entire requested reduction. Accordingly, the transaction processor 306*a-n* may respond with less than what was requested, including indicating no reduction. The transmission of the data message may be referred to as a commit operation as the transaction processor 306*a-n* has committed the reported amount to the reallocation process and can no longer use it. In a sense, each transaction processor 306*a-n* may be considered to be lending the amount to the system 300. It will be appreciated that a transaction processor 306*a-n* need not report the entire remaining amount of the limit that is still has. That is, a transaction processor 306*a-n* may reserve some so as to be able to continue operating and processing transactions during the reallocation process. The reserve amount may be predefined. Accordingly, the available amount may be less than the remainder of the portion of the total limit previously allocated thereto.

Upon receipt of each data message, an accumulator 316 accumulates, such as in the memory 304, the amount of each reduction indicated thereby. In one embodiment, the system 300 awaits responses from the transaction processors 306*a-n* only for a defined time limit, e.g. 30 seconds, upon the elapse of which the system 300 continues the reallocation process with whichever responses have been received and accumulated.

A reallocation calculator 320 coupled with the accumulator 316 is operative to allocate a portion of the accumulated amounts of reduction to each of the plurality of transaction processors 306*a-n* for which the proposed portion of the total limit to be allocated thereto is greater than the portion of the total limit previously allocated thereto, i.e., to each transaction processor 306*a-n* receiving a limit increase. As only the accumulated responses are reallocated, the system 300 eliminates the possibility of allocating more than the total/global limit and risking a credit overrun.

The system 300 further includes new limit transmitted 322 coupled with the reallocation calculator 320 and operative to transmit, via the communications network 308, a data message to each of the plurality of transaction processors 306*a-n* for which the proposed portion of the total limit to be allocated thereto is greater than the portion of the total limit previously allocated thereto, the data message comprising data indicative of an increase to the portion of the total limit previously allocated thereto in an amount of the portion of the accumulated amount allocated thereto, the receiving transaction processor 306*a-n*, based on receipt thereof, adjusting the portion of the total limit previously allocated thereto based on the allocated portion of the accumulated amount.

It will be appreciated that, in the interest of expediting the reallocation process, or more of the operations described above may be performed in parallel and/or in advance of transmitting the requests to the transaction processors 306*a-n* so as to minimize the amount of time between transmitting the requests, or receiving the responses thereto, and the transmission of the increased limits. Such parallel or advance processing may be performed using the shadow database 324 described herein as a proxy for the actual credit utilization of the transaction processors 306*a-n*.

One or more of the transaction status receiver 310, local demand accumulator/rebalance logic 312, limit generator 314, accumulator 316, reallocation calculator 320, or new limit transmitter 322 may be computer executable program code stored in the memory 304, implemented as a separate component or as one or more logic components, such as on an FPGA which may include a memory or reconfigurable component to store logic and a processing component to execute the stored logic, or as first and second logic respectively, e.g. computer program logic, stored in a memory, such as the memory 204 shown in FIG. 2 and described in more detail above with respect thereto, or other non-transitory computer readable medium, and executable by a processor 302, such as the processor 204 shown in FIG. 2 and described in more detail above with respect thereto, to cause the processor 302 to, or otherwise be operative as described.

In one embodiment, the computer executable instructions are further executable by the processor 302 to cause the processor 302 to determine, based on the accumulated associated transactional values of transactions for which the received data indicative thereof indicates those transactions were both accepted and executed, one or more of the transactions that were both accepted and executed by one of the plurality of transaction processors 306*a-n* which are at least partially offset, e.g., with respect to risk of loss, by one or more of the transactions that were both accepted and executed by another of the plurality of transaction processors 306*a-n*, and based thereon transmit to one of, or both, the one transaction processor 306*a-n* or the other transaction processor 306*a-n*, a data message comprising data indicative of an amount of the offset, wherein, upon receipt, the one or the other transaction processor 306*a-n* adjusts, based on the amount of the offset, an amount of the portion of the total limit previously allocated thereto.

In one embodiment, the computer executable instructions are further executable by the processor 302 to cause the processor 302 to, prior to the determination of the one or more of the transactions that were both accepted and executed by one of the plurality of transaction processors 306*a-n* which are at least partially offset by one or more of the transactions that were both accepted and executed by another of the plurality of transaction processors 306*a-n*, direct the one and the other transaction processors 306*a-n* to prevent one or more of the transactions that were both accepted and executed by the one transaction processor 306*a-n* and the one or more of the transactions that were both accepted and executed by the other transaction processor 306*a-n* from being closed until after receipt of the data indictive of the amount of the offset. In one embodiment, the transaction processors 306*a-n* may be directed to treat the subject transactions as "working" or otherwise accepted but not executed, which causes the transaction processors 306*a-n* to not allow those transactions to be locally offset, which may undermine the global netting operation as described elsewhere herein.

In one embodiment, the amount consumed of the portion of the total limit previously allocated to a transaction processor 306*a-n* changes after the transaction processor 306*a-n* transmits the data indicative of either a rejection or at least acceptance and an associated transactional value of a transaction processed thereby, the accumulated associated transactional values of the transaction processor 306*a-n*, therefore, being not equal to the amount consumed. This may be due to the delay caused by latency, e.g., via the network 308 between the transaction processors 306*a-n* and the processor 302.

In one embodiment, the amount consumed of the portion of the total limit previously allocated to a transaction processor 306*a-n* accounts, i.e., via local netting/offsetting, for one or more transactions processed by that transaction processor 306*a-n* which offset one or more other transactions processed by that transaction processor 306*a-n*, the accumulated associated transactional values of the transaction processor 306*a-n*, therefore, being not equal to the amount consumed.

In one embodiment, the total limit comprises a global credit limit.

In one embodiment, the total limit is one of a plurality of total limits, each governing acceptance of a subset of transactions, e.g., between different counterparties, processed by the plurality of transaction processors 306*a-n*.

In one embodiment, the data indicative of either a rejection or at least acceptance and an associated transactional value of a transaction further indicates that the transaction was executed subsequent to acceptance, and wherein associated transactional values for transactions accepted but not executed are accumulated separately, i.e., as indicative of hypothetical demand, from associated transaction values for transactions both accepted and executed, i.e., indicative of actual demand.

In one embodiment, the associated transactional values for transactions processed within a first time period are accumulated, e.g., indicative of short term demand, separately from associated transaction values for transactions processed within a second time period longer than the first time period, e.g., indicative of long term demand.

In one embodiment, each of the plurality of transactions comprises a currency transaction, the associated transactional value comprising a notional, gross and/or net, value of the currency transaction.

In one embodiment, at least two of the plurality of transactions are associated with different transactional values.

In one embodiment, the allocation processor 302 is located closer, e.g., logically and/or geographically/physically, to one of the plurality of transaction processors 306*a-n* than to any other of the plurality of transaction processors 306*a-n*.

In one embodiment, the amount by which the transaction processor 306*a-n* has reduced the portion of the total limit previously allocated thereto received from each of the plurality of transaction processors 306*a-n* for which the proposed portion of the total limit to be allocated thereto is less than the portion of the total limit previously allocated thereto, is computed by the transaction processor 306*a-n* based on the proposed portion of the total limit to be allocated thereto and the portion of the total limit previously allocated thereto.

In one embodiment, the accumulated associated transactional values of transactions processed by a transaction processor 306*a-n* are indicative of historical consumption of the portion of the total limit previously allocated thereto. As was discussed above, demand accounting in the disclosed embodiments also depreciates accumulated limit demand based on a schedule. Depreciation allows the balancing function to adapt to new patterns of limit interest across the transaction processors. Demand accounting may be a singular demand accumulator or an arrangement or demand accumulators based on time-of-day or other basis. The disclosed embodiments may use both a singular accumulator (short term demand) and a time-of-day accumulator (long term demand). This approach supports the dynamic nature of the balancing-providing a reactive and proactive balancing response.

In one embodiment, the computing, for each of the plurality of transaction processors 306*a-n*, of the proposed portion of the total limit to be allocated thereto uses a heuristic mechanism and/or machine learning.

In one embodiment, at least one of the plurality of transaction processors 306*a-n* comprises an electronic match engine 106, wherein transactions processed thereby comprise orders to trade quantities of financial instruments received from market participants, wherein acceptance thereof comprises matching the order to trade with a suitable counter-order which results in creation of positions for each of the market participants involved.

Figure 4:
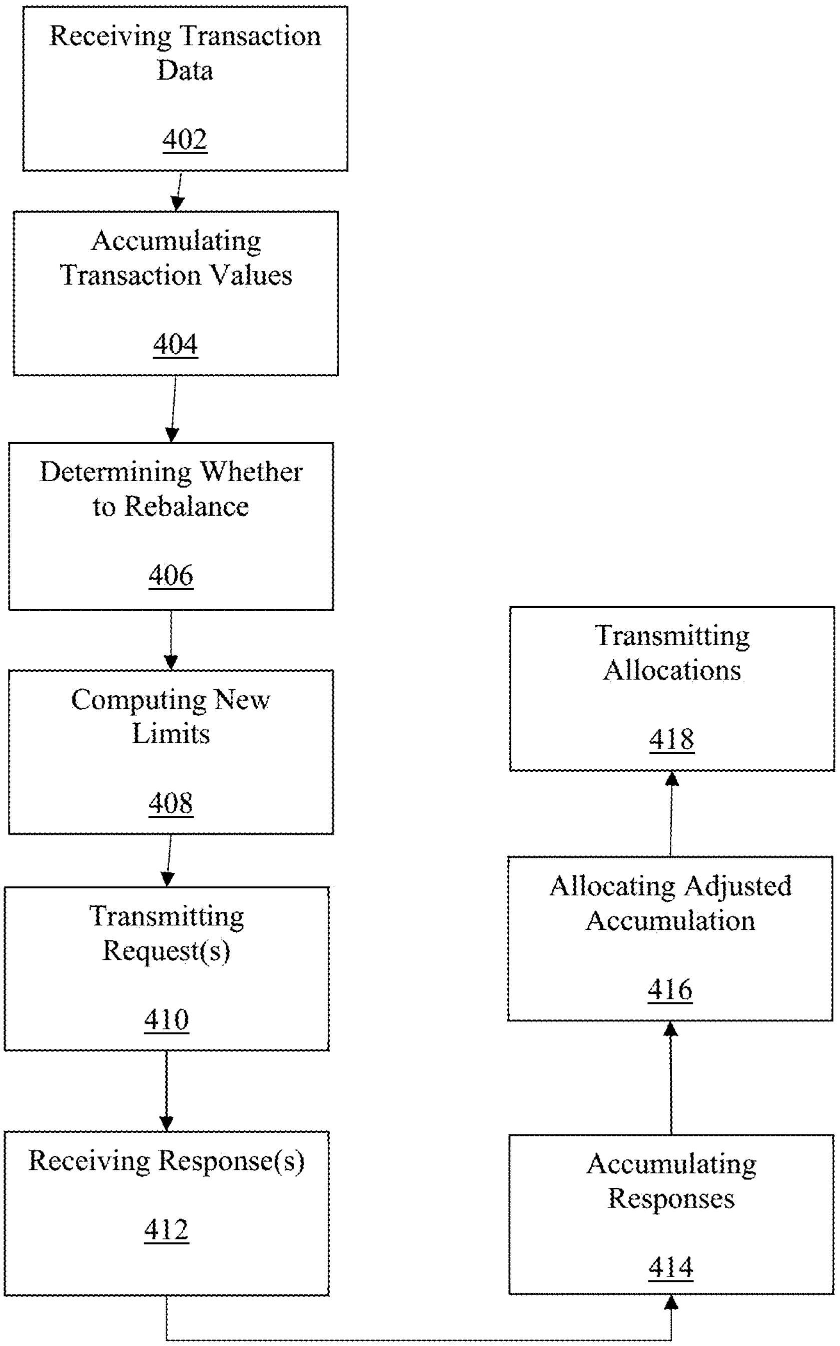
FIG. 4 is a flow diagram depicting operation of the system of FIG. 3.

FIG. 4 depicts a flow chart showing operation of the system 300 of FIG. 3. In particular FIG. 4 shows a method, which may be computer implemented, for regulating distributed processing of a plurality of transactions, each characterized by an associated transactional value, in accordance with a dynamically reallocated global limit defining a total associated transactional value of processed transactions.

The operation of the system 300 may include: receiving, by an allocation processor 302, or a receiver 310 thereof, from any one of a distributed plurality of transaction processors 306*a-n* via a communications network 308 (160, 162, 220) coupled therebetween, data indicative of either a rejection or at least acceptance and an associated transactional value of a transaction processed thereby, the at least acceptance of a transaction by a particular one of the plurality of transaction processors 306*a-n* causing an amount of a portion of a total limit previously allocated thereto to be consumed in accordance with the transactional value associated with the at least accepted transaction, a transaction being rejected by a transaction processor 306*a-n* when, as compared at least with the transactional value associated with the rejected transaction, an insufficient amount remains of the portion of the total limit previously allocated thereto (Block 402); accumulating, by the allocation processor 302, the associated transactional values of the at least accepted transactions, separately in association with each transaction processor 306*a-n* from which data indicative thereof was received, in a database coupled with the allocation processor 302 (Block 404); determining, by the allocation processor 302, that at least one of the plurality of transaction processors 306*a-n* has rejected a transaction or, based solely on the accumulated transactional values in the database, at least one of the plurality of transaction processors 306*a-n* has an associated accumulated transactional value equal to, or within a threshold of, the portion of the total limit previously allocated thereto, and a computed difference between the total limit and a total of the accumulated transactional values associated with all of the transaction processors 306*a-n* in the database exceeds a defined threshold amount (Block 406), and based thereon: computing, by the allocation processor 302 based on the accumulated transactional values associated with all of the transaction processors 306*a-n* stored in the database and the computed difference, for each of the plurality of transaction processors 306*a-n*, a proposed portion of the total limit to be allocated thereto which is greater than, equal to, or less than the portion of the total limit previously allocated thereto (Block 408); transmitting, by the allocation processor 302 via the communications network 308, a request message to each of the plurality of transaction processors 306*a-n* for which the proposed portion of the total limit to be allocated thereto is less than the portion of the total limit previously allocated thereto, the request message requesting that each of those transaction processors 306*a-n* reduce the portion of the total limit previously allocated thereto to the proposed portion of the total limit to be allocated thereto and respond with a data message comprising data indicative of an amount by which the transaction processor 306*a-n* has reduced the portion of the total limit previously allocated thereto responsive to the requested reduction (Block 410); upon receipt of each data message, accumulating, by the allocation processor 302, the amount of each reduction indicated thereby (Blocks 412, 414); allocating, by the allocation processor 302, a portion of the accumulated amounts of reduction to each of the plurality of transaction processors 306*a-n* for which the proposed portion of the total limit to be allocated thereto is greater than the portion of the total limit previously allocated thereto (Block 416); and transmitting, by the allocation processor 302 via the communications network 308, a data message to each of the plurality of transaction processors 306*a-n* for which the proposed portion of the total limit to be allocated thereto is greater than the portion of the total limit previously allocated thereto, the data message comprising data indicative of an increase to the portion of the total limit previously allocated thereto in an amount of the portion of the accumulated amount allocated thereto, the receiving transaction processor 306*a-n*, based on receipt thereof, adjusting the portion of the total limit previously allocated thereto based on the allocated portion of the accumulated amount (Block 418).

In one embodiment, the operation of the system 300 further includes determining, by the allocation processor 302 based on the accumulated associated transactional values of transactions for which the received data indicative thereof indicates those transactions were both accepted and executed, one or more of the transactions that were both accepted and executed by one of the plurality of transaction processors 306*a-n* which are at least partially offset by one or more of the transactions that were both accepted and executed by another of the plurality of transaction processors 306*a-n*, and based thereon transmitting, by the allocation processor 302, to one of, or both, the one transaction processor 306*a-n* or the other transaction processor 306*a-n*, a data message comprising data indicative of an amount of the offset, wherein, upon receipt, the one or the other transaction processor 306*a-n* adjusts, based on the amount of the offset, an amount of the portion of the total limit previously allocated thereto.

In one embodiment, the operation of the system 300 further includes, prior to the determining of the one or more of the transactions that were both accepted and executed by one of the plurality of transaction processors 306*a-n* which are at least partially offset by one or more of the transactions that were both accepted and executed by another of the plurality of transaction processors 306*a-n*, directing the one and the other transaction processors 306*a-n* to prevent one or more of the transactions that were both accepted and executed by the one transaction processor 306*a-n* and the one or more of the transactions that were both accepted and executed by the other transaction processor 306*a-n* from being closed until after receipt of the data indictive of the amount of the offset.

In one embodiment, the amount consumed of the portion of the total limit previously allocated to a transaction processor 306*a-n* changes after the transaction processor 306*a-n* transmits the data indicative of either a rejection or at least acceptance and an associated transactional value of a transaction processed thereby, the accumulated associated transactional values of the transaction processor 306*a-n*, therefore, being not equal to the amount consumed.

In one embodiment, the amount consumed of the portion of the total limit previously allocated to a transaction processor 306*a-n* accounts for one or more transactions processed by that transaction processor 306*a-n* which offset one or more other transactions processed by that transaction processor 306*a-n*, the accumulated associated transactional values of the transaction processor 306*a-n*, therefore, being not equal to the amount consumed.

In one embodiment, the total limit comprises a global credit limit.

In one embodiment, the total limit is one of a plurality of total limits, each governing acceptance of a subset of transactions processed by the plurality of transaction processors 306*a-n*.

In one embodiment, the data indicative of either a rejection or at least acceptance and an associated transactional value of a transaction further indicates that the transaction was executed subsequent to acceptance, and wherein associated transactional values for transactions accepted but not executed are accumulated separately from associated transaction values for transactions both accepted and executed.

In one embodiment, associated transactional values for transactions processed within a first time period are accumulated separately from associated transaction values for transactions processed within a second time period longer than the first time period.

In one embodiment, each of the plurality of transactions comprises a currency transaction, the associated transactional value comprising a notional, gross and/or net, value of the currency transaction.

In one embodiment, at least two of the plurality of transactions are associated with different transactional values.

In one embodiment, the allocation processor 302 is located closer to one of the plurality of transaction processors 306*a-n* than to any other of the plurality of transaction processors 306*a-n*.

In one embodiment, the amount by which the transaction processor 306*a-n* has reduced the portion of the total limit previously allocated thereto received from each of the plurality of transaction processors 306*a-n* for which the proposed portion of the total limit to be allocated thereto is less than the portion of the total limit previously allocated thereto, is computed by the transaction processor 306*a-n* based on the proposed portion of the total limit to be allocated thereto and the portion of the total limit previously allocated thereto.

In one embodiment, the accumulated associated transactional values of transactions processed by a transaction processor 306*a-n* are indicative of historical consumption of the portion of the total limit previously allocated thereto. As was discussed above, demand accounting in the disclosed embodiments also depreciates accumulated limit demand based on a schedule. Depreciation allows the balancing function to adapt to new patterns of limit interest across the transaction processors. Demand accounting may be a singular demand accumulator or an arrangement or demand accumulators based on time-of-day or other basis. The disclosed embodiments may use both a singular accumulator (short term demand) and a time-of-day accumulator (long term demand). This approach supports the dynamic nature of the balancing-providing a reactive and proactive balancing response.

In one embodiment, the computing, for each of the plurality of transaction processors 306*a-n*, of the proposed portion of the total limit to be allocated thereto uses machine learning.

In one embodiment, at least one of the plurality of transaction processors 306*a-n* comprises an electronic match engine 106, wherein transactions processed thereby comprise orders to trade quantities of financial instruments received from market participants, wherein acceptance thereof comprises matching the order to trade with a suitable counter-order which results in creation of positions for each of the market participants involved.

The order of the acts or steps of the operation may vary from the example shown. For example, the trade activity monitoring may be implemented concurrently with the other acts. Additional, fewer, or alternative acts may be implemented. For example, the method may include an additional allocation adjustment procedure dedicated to handling use of the credit limit. The additional procedure may be useful because an update to the underlying allocations may not be warranted as a result of such use, but nevertheless the allocation data used by one of the credit controller should be updated to reflect the use of the credit allocation.

Embodiments of systems and methods for controlling use of a credit limit in connection with electronic trading in a plurality of product groups are described above. The disclosed systems and methods prevent credit overages, or slippage, allowed by previous credit controls. As described above, the credit allocations are determined automatically by product group. For product groups that move between trading venues during each given trading day, the credit allocations may follow the product groups from venue to venue by providing the allocation data to the credit controller at the match engine of the new venue. The credit controls of the disclosed systems and methods are thus enforced venue by venue, but with allocations determined product by product.

The disclosed systems and methods periodically or otherwise check consumption of credit to determine the probability of future credit consumption within each product group. The disclosed systems and methods may thus be based on the recognition that a customer trading heavily in one product is likely to continue trading in that product. In that way, credit is reallocated to heavily traded products.

The disclosed systems and methods may, as described, use heuristic, feedback or stateful mechanisms which evaluate historical data to determine future actions, or may use machine learning or other artificial intelligence routines which may determine future actions based on predictive models, etc. The accuracy of the predictions may thus improve over time, i.e., with each update. The allocations may nonetheless be overridden by the market participant(s) in some cases.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the terms "computer-readable medium" and "computer-readable storage medium" include a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer-readable storage medium may be or include a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an example, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The disclosed computer programs (also known as a program, software, software application, script, or code) can be written in any form of programming language, including compiled or interpreted languages. The disclosed computer programs can be deployed in any form, including as a standalone program or as a module, component, subroutine, or other unit suitable for use in a computing environment. Such computer programs do not necessarily correspond to a file in a file system. Such programs can be stored in a portion of a file that holds other programs or data (e.g., one or more scripts stored in a markup language document), in a single file dedicated to the program in question, or in multiple coordinated files (e.g., files that store one or more modules, sub programs, or portions of code). Such computer programs can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:

accumulating, by an allocation processor, associated transactional values of at least accepted transactions for which data indicative thereof has been communicated to the allocation processor from transaction processors via a communications network coupled therebetween as a result of transactions processed thereby, in association with the transaction processor from which data indicative thereof was received, in a shadow database coupled with and exclusively maintained by the allocation processor, the shadow database maintaining accumulations for any transaction processors in communication with the allocation processor via the communications network, each transaction processor also maintaining its own accumulation of the transactional values of the at least accepted transactions accepted thereby, the at least acceptance of a transaction by the transaction processor causing an amount of a portion of a total limit previously allocated thereto to be consumed in accordance with a transactional value associated with the at least accepted transaction, a transaction not being accepted by the transaction processor when, as compared at least with the transactional value associated with the unaccepted transaction, an insufficient amount remains of the portion of the total limit previously allocated thereto;

determining, by the allocation processor, that one of the transaction processors has not accepted a transaction or, based solely on the accumulated transactional values in the shadow database, at least one transaction processor has an associated accumulated transactional value at least within a threshold of the portion of the total limit previously allocated thereto, and a computed difference between the total limit and a total of the accumulated transactional values associated with all of the transaction processors in the shadow database exceeds a defined threshold amount, and based thereon:

computing, by the allocation processor based on the accumulated transactional values associated with all of the transaction processors stored in the shadow database and the computed difference, for each of the transaction processors, a proposed portion of the total limit to be allocated thereto;

transmitting, by the allocation processor via the communications network, a request message to each of the transaction processors for which the proposed portion of the total limit to be allocated thereto is less than the portion of the total limit previously allocated thereto, the request message requesting that each of those transaction processors reduce the portion of the total limit previously allocated thereto to the proposed portion of the total limit to be allocated thereto and respond with a data message comprising data indicative of an amount by which the transaction processor has reduced the portion of the total limit previously allocated thereto responsive to the requested reduction based on its own maintained accumulation of the transactional values of the at least accepted transactions accepted thereby;

upon receipt of each data message, accumulating, by the allocation processor, the amount of each reduction indicated thereby;

allocating, by the allocation processor, a portion of the accumulated amounts of reduction to each of the transaction processors for which the proposed portion of the total limit to be allocated thereto is greater than the portion of the total limit previously allocated thereto and transmitting thereto a data message comprising data indicative of an increase to the portion of the total limit previously allocated thereto in an amount of the portion of the accumulated amount allocated thereto, the receiving transaction processor, based on receipt thereof, adjusting the portion of the total limit previously allocated thereto based on the allocated portion of the accumulated amount.

2. The computer implemented method of claim 1, further comprising:

determining, by the allocation processor based on the accumulated associated transactional values of transactions for which the received data indicative thereof indicates those transactions were both accepted and executed, one or more of the transactions that were both accepted and executed by one of the transaction processors which are at least partially offset by one or more of the transactions that were both accepted and executed by another of the transaction processors, and based thereon transmitting, by the allocation processor, to one of, or both, the one transaction processor or the other transaction processor, a data message comprising data indicative of an amount of the offset, wherein, upon receipt, the one or the other transaction processor adjusts, based on the amount of the offset, an amount of the portion of the total limit previously allocated thereto.

3. The computer implemented method of claim 1, wherein the amount consumed of the portion of the total limit previously allocated to a transaction processor changes after the transaction processor transmits the data indicative of at least acceptance and an associated transactional value of a transaction processed thereby, the accumulated associated transactional values of the transaction processor, therefore, being not equal to the amount consumed.

4. The computer implemented method of claim 1, wherein the amount consumed of the portion of the total limit previously allocated to a transaction processor accounts for one or more transactions processed by that transaction processor which offset one or more other transactions processed by that transaction processor, the accumulated associated transactional values of the transaction processor, therefore, being not equal to the amount consumed.

5. The computer implemented method of claim 1, wherein the total limit comprises a credit limit.

6. The computer implemented method of claim 1, wherein the total limit is one of a plurality of total limits, each governing acceptance of a subset of transactions processed by the transaction processors.

7. The computer implemented method of claim 1, wherein the data indicative of at least acceptance and an associated transactional value of a transaction further indicates that the transaction was executed subsequent to acceptance, and wherein associated transactional values for transactions accepted but not executed are accumulated separately from associated transaction values for transactions both accepted and executed.

8. The computer implemented method of claim 1, wherein associated transactional values for transactions processed within a first time period are accumulated separately from associated transaction values for transactions processed within a second time period.

9. The computer implemented method of claim 1, wherein each of the plurality of transactions comprises a currency transaction, the associated transactional value comprising notional value of the currency transaction.

10. The computer implemented method of claim 1, wherein the allocation processor is located closer to one of the transaction processors than to any other of the transaction processors.

11. The computer implemented method of claim 1, wherein the amount by which the transaction processor has reduced the portion of the total limit previously allocated thereto received from each of the transaction processors for which the proposed portion of the total limit to be allocated thereto is less than the portion of the total limit previously allocated thereto, is computed by the transaction processor based on the proposed portion of the total limit to be allocated thereto and the portion of the total limit previously allocated thereto.

12. The computer implemented method of claim 1, wherein the accumulated associated transactional values of transactions processed by a transaction processor are indicative of historical consumption of the portion of the total limit previously allocated thereto.

13. The computer implemented method of claim 1, wherein the computing, for each of the transaction processors, of the proposed portion of the total limit to be allocated thereto uses machine learning.

14. The computer implemented method of claim 1, wherein at least one of the transaction processors comprises an electronic match engine, wherein transactions processed thereby comprise orders to trade quantities of financial instruments received from market participants, wherein acceptance thereof comprises matching the order to trade with a suitable counter-order which results in creation of positions for each of the market participants involved.

15. A system comprising:

a processor and a memory coupled therewith which stores computer executable instructions that, when executed by the processor, cause the processor to:

accumulate associated transactional values of at least accepted transactions for which data indicative thereof has been communicated to the processor from transaction processors via a communications network coupled therebetween as a result of transactions processed thereby, in association with the transaction processor from which data indicative thereof was received, in a shadow database coupled with and exclusively maintained by the processor, the shadow database maintaining accumulations for any transaction processors in communication with the processor via the communications network, each transaction processor also maintaining its own accumulation of the transactional values of the at least accepted transactions accepted thereby, the at least acceptance of a transaction by the transaction processor causing an amount of a portion of a total limit previously allocated thereto to be consumed in accordance with a transactional value associated with the at least accepted transaction, a transaction not being accepted by the transaction processor when, as compared at least with the transactional value associated with the unaccepted transaction, an insufficient amount remains of the portion of the total limit previously allocated thereto;

determine that one of the transaction processors has not accepted a transaction or, based solely on the accumulated transactional values in the shadow database, at least one transaction processor has an associated accumulated transactional value at least within a threshold of the portion of the total limit previously allocated thereto, and a computed difference between the total limit and a total of the accumulated transactional values associated with all of the transaction processors in the shadow database exceeds a defined threshold amount, and based thereon:

compute, based on the accumulated transactional values associated with all of the transaction processors stored in the shadow database and the computed difference, for each of the transaction processors, a proposed portion of the total limit to be allocated thereto;

transmit, via the communications network, a request message to each of the transaction processors for which the proposed portion of the total limit to be allocated thereto is less than the portion of the total limit previously allocated thereto, the request message comprising a request that each of those transaction processors reduce the portion of the total limit previously allocated thereto to the proposed portion of the total limit to be allocated thereto and respond with a data message comprising data indicative of an amount by which the transaction processor has reduced the portion of the total limit previously allocated thereto responsive to the requested reduction based on its own maintained accumulation of the transactional values of the at least accepted transactions accepted thereby;

upon receipt of each data message, accumulate the amount of each reduction indicated thereby;

allocate a portion of the accumulated amounts of reduction to each of the transaction processors for which the proposed portion of the total limit to be allocated thereto is greater than the portion of the total limit previously allocated thereto and transmit there to a data message comprising data indicative of an increase to the portion of the total limit previously allocated thereto in an amount of the portion of the accumulated amount allocated thereto, the receiving transaction processor, based on receipt thereof, adjusting the portion of the total limit previously allocated thereto based on the allocated portion of the accumulated amount.

16. The system of claim 15, further wherein the computer executable instructions are further executable by the processor to cause the processor to:

determine, based on the accumulated associated transactional values of transactions for which the received data indicative thereof indicates those transactions were both accepted and executed, one or more of the transactions that were both accepted and executed by one of the transaction processors which are at least partially offset by one or more of the transactions that were both accepted and executed by another of the transaction processors, and based thereon transmit to one of, or both, the one transaction processor or the other transaction processor, a data message comprising data indicative of an amount of the offset, wherein, upon receipt, the one or the other transaction processor adjusts, based on the amount of the offset, an amount of the portion of the total limit previously allocated thereto.

17. The system of claim 15, wherein the amount consumed of the portion of the total limit previously allocated to a transaction processor changes after the transaction processor transmits the data indicative of at least acceptance and an associated transactional value of a transaction processed thereby, the accumulated associated transactional values of the transaction processor, therefore, being not equal to the amount consumed.

18. The system of claim 15, wherein the amount consumed of the portion of the total limit previously allocated to a transaction processor accounts for one or more transactions processed by that transaction processor which offset one or more other transactions processed by that transaction processor, the accumulated associated transactional values of the transaction processor, therefore, being not equal to the amount consumed.

19. The system of claim 15, wherein the total limit comprises a credit limit.

20. The system of claim 15, wherein the total limit is one of a plurality of total limits, each governing acceptance of a subset of transactions processed by the transaction processors.

21. The system of claim 15, wherein the data indicative of at least acceptance and an associated transactional value of a transaction further indicates that the transaction was executed subsequent to acceptance, and wherein associated transactional values for transactions accepted but not executed are accumulated separately from associated transaction values for transactions both accepted and executed.

22. The system of claim 15, wherein associated transactional values for transactions processed within a first time period are accumulated separately from associated transaction values for transactions processed within a second time period.

23. The system of claim 15, wherein each of the plurality of transactions comprises a currency transaction, the associated transactional value comprising notional value of the currency transaction.

24. The system of claim 15, wherein the processor is located closer to one of the transaction processors than to any other of the transaction processors.

25. The system of claim 15, wherein the amount by which the transaction processor has reduced the portion of the total limit previously allocated thereto received from each of the transaction processors for which the proposed portion of the total limit to be allocated thereto is less than the portion of the total limit previously allocated thereto, is computed by the transaction processor based on the proposed portion of the total limit to be allocated thereto and the portion of the total limit previously allocated thereto.

26. The system of claim 15, wherein the accumulated associated transactional values of transactions processed by a transaction processor are indicative of historical consumption of the portion of the total limit previously allocated thereto.

27. The system of claim 15, wherein the computing, for each of the plurality of transaction processors, of the proposed portion of the total limit to be allocated thereto uses machine learning.

28. The system of claim 15, wherein at least one of the plurality of transaction processors comprises an electronic match engine, wherein transactions processed thereby comprise orders to trade quantities of financial instruments received from market participants, wherein acceptance thereof comprises matching the order to trade with a suitable counter-order which results in creation of positions for each of the market participants involved.

29. A system comprising:

means for accumulating associated transactional values of at least accepted transactions for which data indicative thereof has been communicated to the processor from transaction processors via a communications network coupled therebetween as a result of transactions processed thereby, in association with the transaction processor from which data indicative thereof was received, in a shadow database coupled with and exclusively maintained by the processor, the shadow database maintaining accumulations for any transaction processors in communication with the processor via the communications network, each transaction processor also maintaining its own accumulation of the transactional values of the at least accepted transactions accepted thereby, the at least acceptance of a transaction by the transaction processor causing an amount of a portion of a total limit previously allocated thereto to be consumed in accordance with a transactional value associated with the at least accepted transaction, a transaction not being accepted by the transaction processor when, as compared at least with the transactional value associated with the unaccepted transaction, an insufficient amount remains of the portion of the total limit previously allocated thereto;

means for determining that one of the transaction processors has not accepted a transaction or, based solely on the accumulated transactional values in the shadow database, at least one transaction processor has an associated accumulated transactional value at least within a threshold of the portion of the total limit previously allocated thereto, and a computed difference between the total limit and a total of the accumulated transactional values associated with all of the transaction processors in the shadow database exceeds a defined threshold amount, and based thereon:

means for computing, based on the accumulated transactional values associated with all of the transaction processors stored in the shadow database and the computed difference, for each of the transaction processors, a proposed portion of the total limit to be allocated thereto;

means for transmitting, via the communications network, a request message to each of the transaction processors for which the proposed portion of the total limit to be allocated thereto is less than the portion of the total limit previously allocated thereto, the request message requesting that each of those transaction processors reduce the portion of the total limit previously allocated thereto to the proposed portion of the total limit to be allocated thereto and respond with a data message comprising data indicative of an amount by which the transaction processor has reduced the portion of the total limit previously allocated thereto responsive to the requested reduction based on its own maintained accumulation of the transactional values of the at least accepted transactions accepted thereby;

upon receipt of each data message, means for accumulating the amount of each reduction indicated thereby;

means for allocating a portion of the accumulated amounts of reduction to each of the transaction processors for which the proposed portion of the total limit to be allocated thereto is greater than the portion of the total limit previously allocated thereto and transmitting thereto a data message comprising data indicative of an increase to the portion of the total limit previously allocated thereto in an amount of the portion of the accumulated amount allocated thereto, the receiving transaction processor, based on receipt thereof, adjusting the portion of the total limit previously allocated thereto based on the allocated portion of the accumulated amount.

* * * * *